(12) United States Patent
Hoshi et al.

(10) Patent No.: US 9,589,200 B2
(45) Date of Patent: Mar. 7, 2017

(54) HANDWRITING INPUT CONVERSION APPARATUS, COMPUTER-READABLE MEDIUM, AND CONVERSION METHOD

(71) Applicant: FUJITSU LIMITED, Kawasaki-shi, Kanagawa (JP)

(72) Inventors: Tetsuro Hoshi, Setagaya (JP); Aya Takasugi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/744,423

(22) Filed: Jun. 19, 2015

(65) Prior Publication Data

US 2015/0379336 A1 Dec. 31, 2015

(30) Foreign Application Priority Data

Jun. 27, 2014 (JP) .................................. 2014-132767

(51) Int. Cl.
*G06K 9/00* (2006.01)
*G06K 9/20* (2006.01)

(52) U.S. Cl.
CPC ....... *G06K 9/2081* (2013.01); *G06K 9/00429* (2013.01); *G06K 2209/01* (2013.01); *G06K 2209/011* (2013.01)

(58) Field of Classification Search
None
See application file for complete search history.

(56) References Cited

U.S. PATENT DOCUMENTS

| | | | | |
|---|---|---|---|---|
| 5,918,222 A | * | 6/1999 | Fukui | G06Q 10/10 |
| 2008/0310723 A1 | * | 12/2008 | Manu | G06F 3/0237 |
| | | | | 382/182 |

FOREIGN PATENT DOCUMENTS

| | | |
|---|---|---|
| JP | 2008-226019 | 9/2008 |
| JP | 2011-028545 | 2/2011 |
| JP | 2012-048406 | 3/2012 |

OTHER PUBLICATIONS

Kumamoto et al., 'Emotion Dictionary', <URL://http://www.kde.cs.tsukuba.ac.jp/~zjw/wiki/index.php?%E6%84%9F%E6%83%85%E8%BE%9E%E6%9B%B8>, PukiWiki 1.4.7, Oct. 27, 2014, Retrieved from the internet May 12, 2015 (6 pages).

* cited by examiner

*Primary Examiner* — Chan Park
*Assistant Examiner* — Elisa Rice
(74) *Attorney, Agent, or Firm* — Fujitsu Patent Center

(57) ABSTRACT

A conversion apparatus is disclosed, including: a storage unit; and a processor configured to perform a conversion process. In the conversion process, a handwriting input for a specific position in a text is received. Conversion candidates for the handwriting input is generated based on context information acquired by analyzing before, after, or around the specific position of the text.

9 Claims, 27 Drawing Sheets

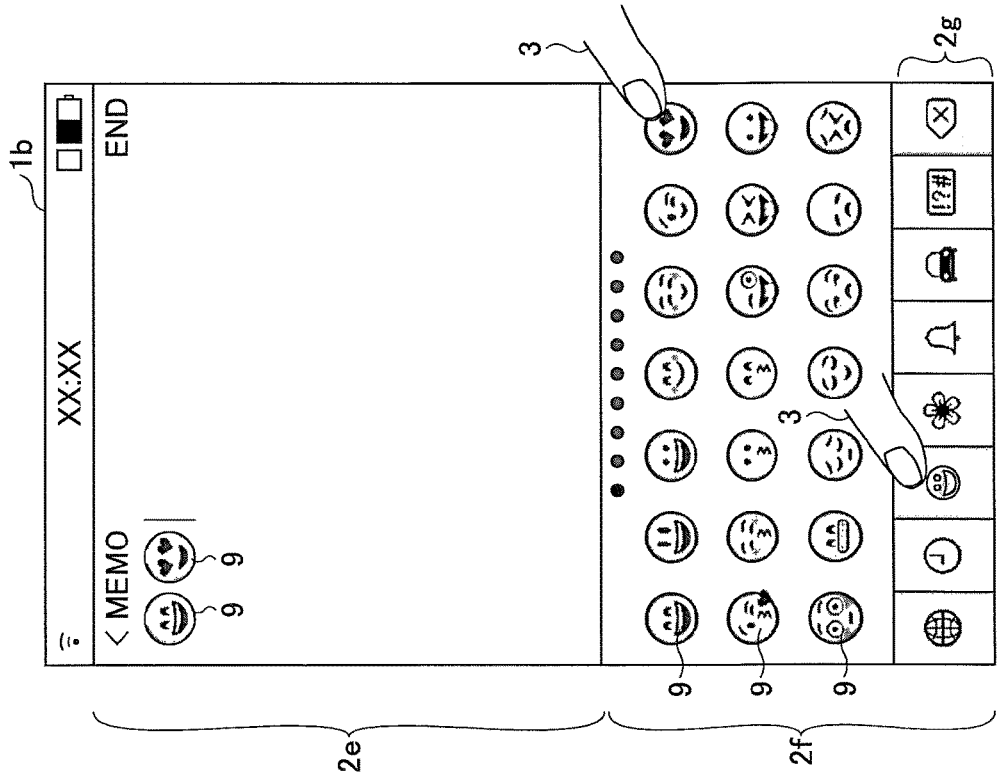
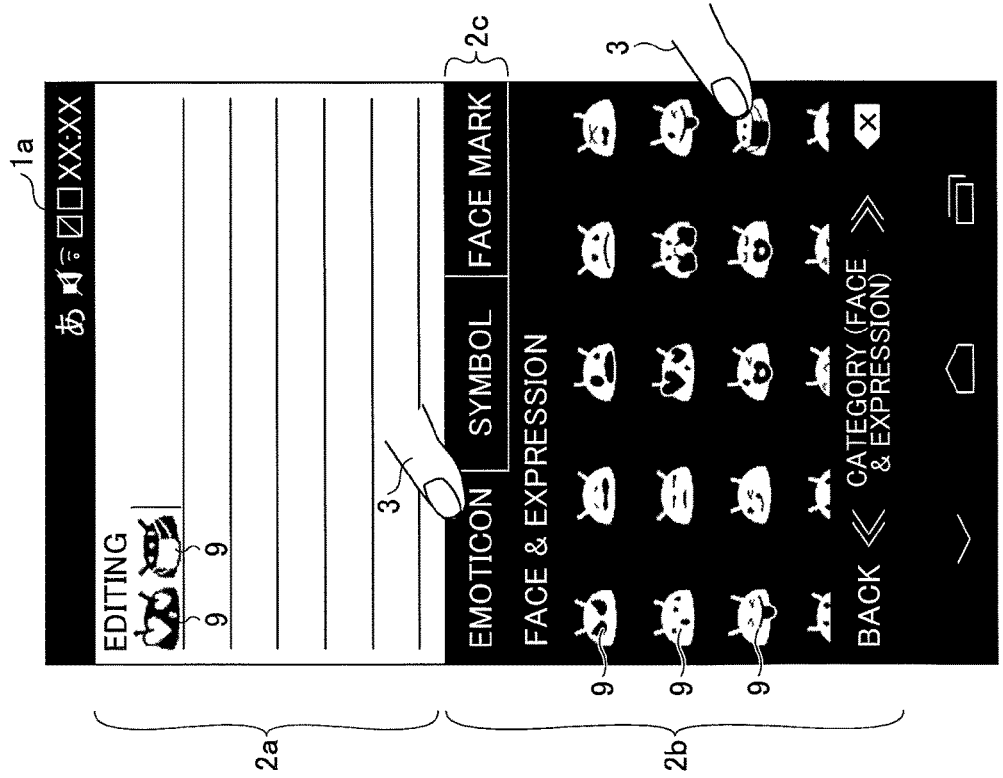
FIG.1A
FIG.1B

FIG.4
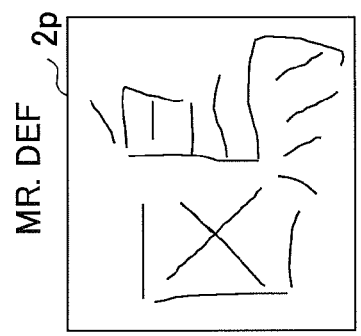
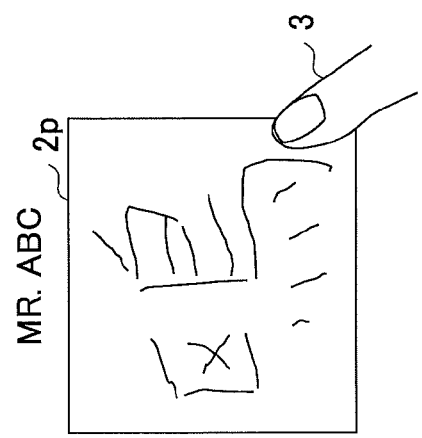

} 9

} 9

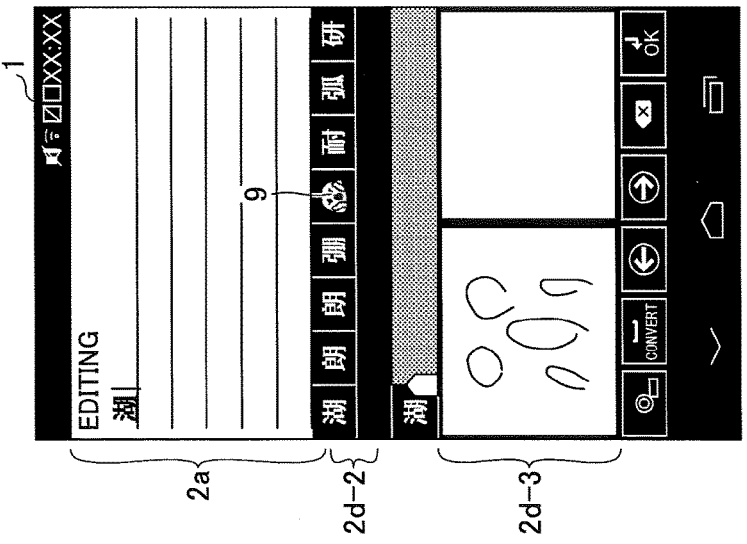
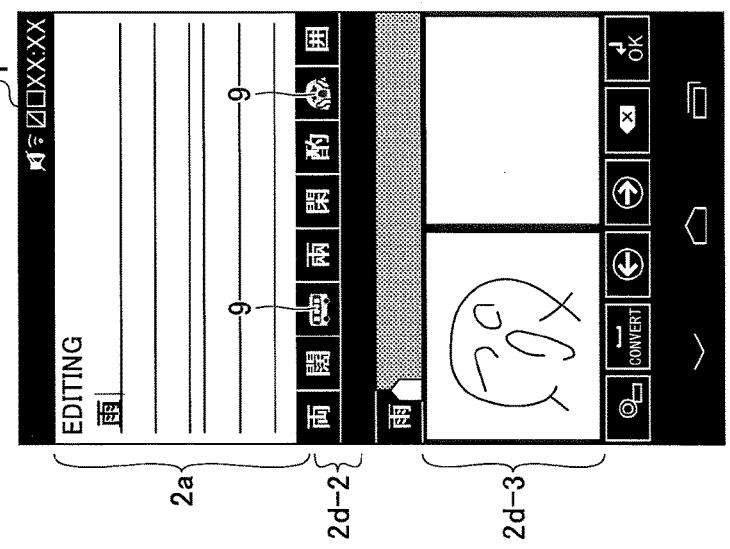
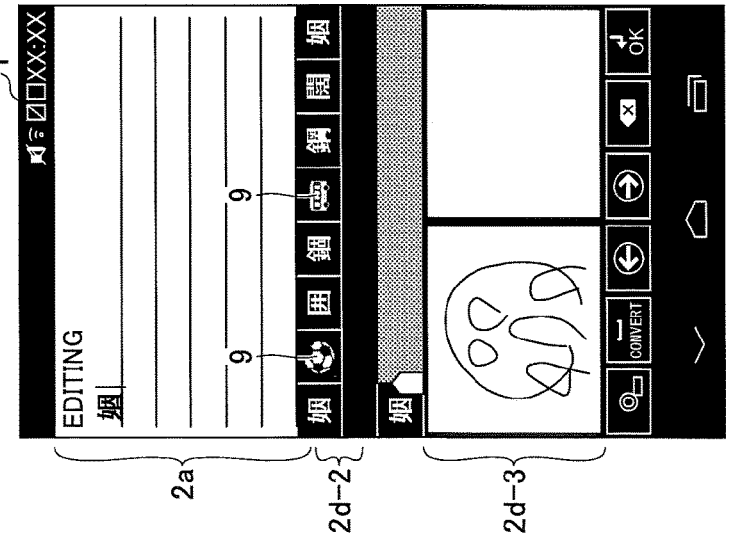

FIG.9
| CHARACTER SHAPE | COORDINATES AND STROKE ORDER INFORMATION | CHARACTER CODE | EMOTION LABEL |
|---|---|---|---|
|  | (x, y)(x, y)... | 0xAAAA | ANGER |
|  | (x, y)(x, y)... | 0xBBBB | HAPPY |
|  | (x, y)(x, y)... | 0xCCCC | SAD |
|  | (x, y)(x, y)... | 0xDDDD | FRIGHTENED |
| ... | ... | ... | ... |

FIG.18

EMOTION DICTIONARY
34

| SUBJECT WORD | EMOTION AXIS 1<br>(0.000) SAD <-><br>JOYFUL (1.000) | EMOTION AXIS 2<br>(0.000) ANGER <-><br>HAPPY (1.000) | EMOTION AXIS 3<br>(0.000) FRIGHTENED <-><br>PEACEFUL (1.000) |
|---|---|---|---|
| 勝つ<br>(VICTORY) | 0.706 | 0.780 | 0.187 |
| 偽装<br>(CAMOUFLAGE) | 0.245 | 0.075 | 0.295 |
| ひなまつり<br>(GIRLS' FESTIVAL) | 0.847 | 1.000 | 0.977 |
| 台風<br>(TYPHOON) | 0.351 | 0.459 | 0.203 |
| ... | ... | ... | ... |

FIG.22

FROM FIG.21

MATCH EMOTION LABEL IN STACK AREA WITH EMOTION LABEL OF EACH OF EMOTICONS IN RECOGNITION SCORE TABLE
SPECIFY EMOTICON NOT HAVING AVAILABLE EMOTION LABEL FROM RECOGNITION SCORE TABLE
DEDUCT BONUS SCORE FROM RECOGNITION SCORE

A11

37

| EMOTICON | EMOTION LABEL | RECOGNITION SCORE |
|---|---|---|
| 9 | ANGER | 8 |
| 9 | FRIGHTENED | 7 |
| 9 | ANGER | 6 |
| 9 | JOYFUL | 5 |

36

| EMOTION LABEL | BONUS SCORE |
|---|---|
| FRIGHTENED | 2 |

37

| EMOTICON | EMOTION LABEL | RECOGNITION SCORE |
|---|---|---|
| 9 | FRIGHTENED | 8 |
| 9 | ANGER | 7 |
| 9 | ANGER | 6 |
| 9 | JOYFUL | 5 |

 39

TYPHOON IS COMING ?

A12

DISPLAY RECOGNITION RESULT FOR USER TO SELECT "  "
FROM CANDIDATES AND TO CONFIRM USER'S INPUTS

9

END

FIG.23

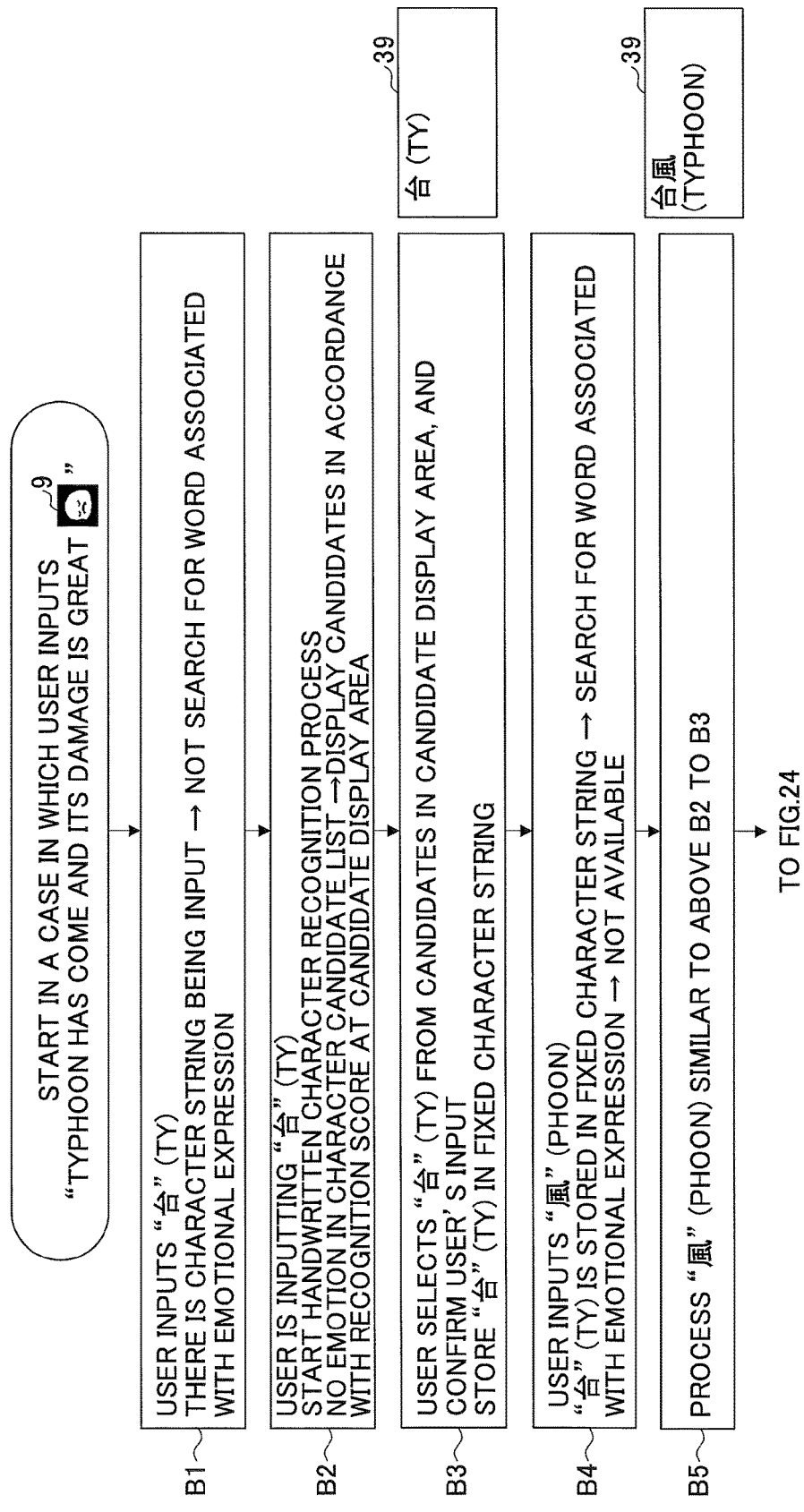

B1 — START IN A CASE IN WHICH USER INPUTS "TYPHOON HAS COME AND ITS DAMAGE IS GREAT 😖"

USER INPUTS "台" (TY)
THERE IS CHARACTER STRING BEING INPUT → NOT SEARCH FOR WORD ASSOCIATED WITH EMOTIONAL EXPRESSION

B2 — USER IS INPUTTING "台" (TY)
START HANDWRITTEN CHARACTER RECOGNITION PROCESS
NO EMOTION IN CHARACTER CANDIDATE LIST →DISPLAY CANDIDATES IN ACCORDANCE WITH RECOGNITION SCORE AT CANDIDATE DISPLAY AREA

B3 — USER SELECTS "台" (TY) FROM CANDIDATES IN CANDIDATE DISPLAY AREA, AND CONFIRM USER'S INPUT
STORE "台" (TY) IN FIXED CHARACTER STRING

B4 — USER INPUTS "風" (PHOON)
"台" (TY) IS STORED IN FIXED CHARACTER STRING → SEARCH FOR WORD ASSOCIATED WITH EMOTIONAL EXPRESSION → NOT AVAILABLE

B5 — PROCESS "風" (PHOON) SIMILAR TO ABOVE B2 TO B3

FROM FIG.23
↓

B6 — USER INPUTS "が" (IS)
"台風" IS STORED IN FIXED CHARACTER STRING → SEARCH FOR WORD ASSOCIATED
WITH EMOTIONAL EXPRESSION → AVAILABLE → STACK BONUS SCORE

| | EMOTION LABEL | EMOTION SCORE | EMOTION LABEL |
|---|---|---|---|
| EMOTION AXIS 1 | SAD (0.000) | ▶ 0.351 | JOYFUL (1.000) |
| EMOTION AXIS 2 | ANGER (0.000) | ▶ 0.459 | HAPPY (1.000) |
| EMOTION AXIS 3 | FRIGHTENED (0.000) | ▶ 0.203 | PEACEFUL (1.000) |

— 34

| EMOTION LABEL | BONUS SCORE |
|---|---|
| FRIGHTENED | 2 |

— 36

台風が
(TYPHOON HAS) — 39

B7 — PROCESS "が" (IS) SIMILAR TO ABOVE B2 TO B3

FROM FIG.24

B8 — USER INPUTS "来" (COME), "て" (AND), " " (), AND "被" (DA)
PROCESS THESE WORDS SIMILAR TO ABOVE B4 TO B5

→ 台風が来て、被 (TYPHOON HAS COME AND ITS DA) ~39

B9 — USER INPUTS "害" (MAGE)
STORE "被" IN FIXED CHARACTER STRING
→ SEARCH FOR WORD ASSOCIATED WITH EMOTIONAL EXPRESSION
→ NOT AVAILABLE

→ 台風が来て、被害 (TYPHOON HAS COME AND ITS DAMAGE) ~39

B10 — PROCESS "害" SIMILAR TO ABOVE B2 TO B3

B11 — USER INPUTS "が"
"被害" IS STORED IN FIXED CHARACTER STRING
→ SEARCH FOR WORD ASSOCIATED WITH EMOTIONAL EXPRESSION → AVAILABLE
→ STACK BONUS SCORE

CHARACTER SHAPE DICTIONARY ~32
CHARACTER CANDIDATE LIST ~33
→ EMOTICON
RECOGNITION SCORE TABLE ~37

~34
| | EMOTION LABEL | EMOTION SCORE | | EMOTION LABEL |
|---|---|---|---|---|
| EMOTION AXIS 1 | SAD (0.000) | ▶ 0.090 | • | JOYFUL (1.000) |
| EMOTION AXIS 2 | ANGER (0.000) | ▶ 0.112 | • | HAPPY (1.000) |
| EMOTION AXIS 3 | FRIGHTENED (0.000) | ▶ 0.133 | • | PEACEFUL (1.000) |

~36
| EMOTION LABEL | BONUS SCORE |
|---|---|
| SAD | 2 |

B12 — PROCESS "が" (IS) SIMILAR TO ABOVE B2 TO B3

→ 台風が来て、被害が (TYPHOON HAS COME AND ITS DAMAGE IS) ~39

TO FIG.26

HANDWRITING INPUT CONVERSION APPARATUS, COMPUTER-READABLE MEDIUM, AND CONVERSION METHOD

CROSS-REFERENCE TO RELATED APPLICATIONS

This application is based upon and claims the benefit of priority of the prior Japanese Priority Application No. 2014-132767 filed on Jun. 27, 2014, the entire contents of which are hereby incorporated by reference.

FIELD

The embodiment discussed herein is related to a conversion technology of input by handwriting.

BACKGROUND

Recently, message exchanges using electronic mail, text chat, and the like from an information processing terminal, which is a portable type such as a cellular phone, a tablet terminal, or the like, have become widely popular.

In multiple languages including Japanese, an emoticon culture, which expresses a portion difficult to express by words with an emoticon, is gaining popularity led by young people. Various technologies are presented to improve user-friendliness of inputting the emoticon. A technology has been known to search for the emoticon, which having the same pronunciation as that of characters associated with characters to which inputs are fixed, from an emoticon dictionary section and to display the searched-for emoticon as an input candidate. Another technology has been presented to produce a new emoticon by combining a display (emoticon) of a proclitic phrase with pronunciation of the proclitic phrase (Japanese Katakana in a half width) based on emoticon generation data of the same emotion category as a new phrase being input.

PATENT DOCUMENTS

Japanese Laid-open Patent Publication No. 2012-48406
Japanese Laid-open Patent Publication No. 2008-226019

NON PATENT DOCUMENT

Tadahiko Kumamoto et al., "Emotion Dictionary", <URL://http://www.kde.cs.tsukuba.ac.jp/~zjw/wiki/index-.phpnE6% 84%9F % E6%83%85% E8% BE %9E % E6%9B % B8>

In the above-described technologies, the emoticons are associated with respective words beforehand, and the emoticon associated with a word being input by keys is displayed. Accordingly, it is difficult to input the emoticon by handwriting.

For recent portable information processing terminals, a display part to which a touch panel is applied has been widely used. In such information processing terminals, handwriting recognition is provided. It is usually possible for a user to input characters on the touch panel by handwriting. The handwriting recognition recognizes various types of characters such as alphanumeric, Kanji, Katakana, Hiragana, and the like, based on character shape information and stroke information.

On the other hand, different from the character, a shape of the emoticon is not defined. Drawings of the expression are different from different users. Accordingly, it is difficult to recognize the emoticon drawn by handwriting based on the character shape information and the stroke information.

SUMMARY

According to one aspect of the embodiment, there is provided a handwriting input conversion apparatus, including: a storage unit; and a processor configured to perform a conversion process, wherein the conversion process includes receiving a handwriting input for a specific position in a text; and generating conversion candidates for the handwriting input, based on context information acquired by analyzing before, after, or around the specific position of the text.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 1A and FIG. 1B are diagrams for explaining a first emoticon input method;

FIG. 4 is a diagram illustrating an example of a character handwritten by users;

FIG. 6A through FIG. 6D are diagrams for explaining input examples of the emoticon;

FIG. 9 is a diagram illustrating a data example of a character shape dictionary;

FIG. 18 is a diagram illustrating a data example of an emotion dictionary;

FIG. 22 is a diagram for explaining the process example in the case in which the user inputs the first character string by handwriting;

FIG. 23 is a diagram for explaining another process example in a case in which the user inputs a second character string by handwriting;

FIG. 24 is a diagram for explaining another process example in the case in which the user inputs the second character string by handwriting;

FIG. 25 is a diagram for explaining another process example in the case in which the user inputs the second character string by handwriting;

DESCRIPTION OF EMBODIMENTS

Figure 2B:
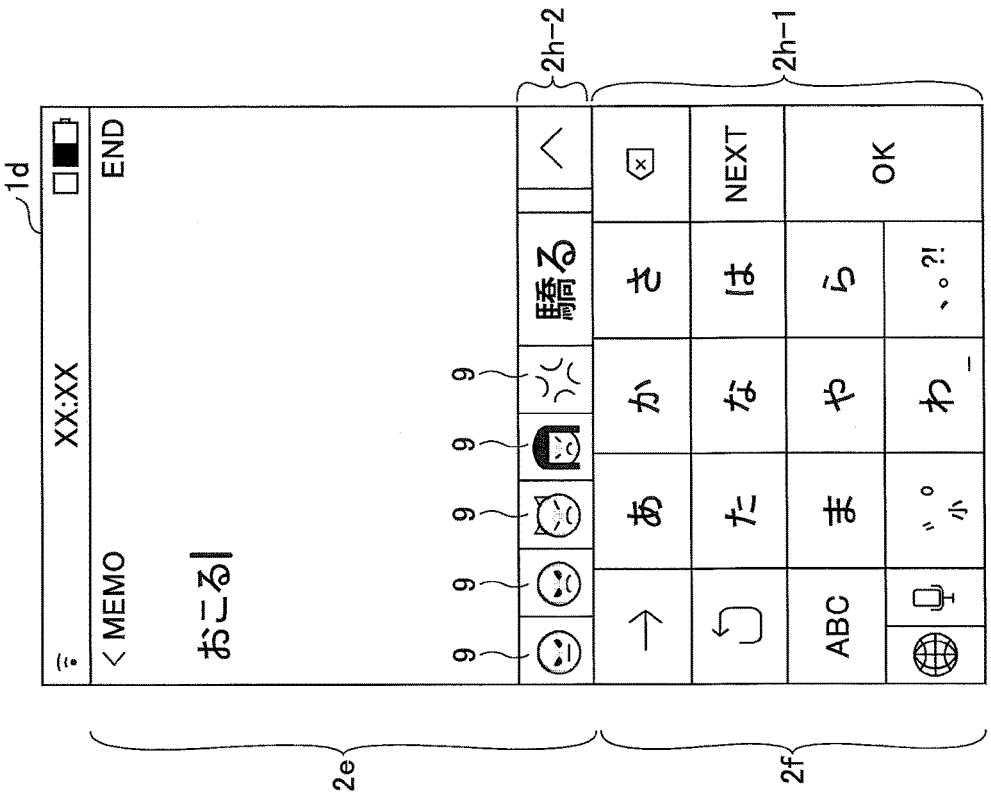
FIG. 2A and FIG. 2B are diagrams for explaining a second emoticon input method.

In the following, an embodiment of the present invention will be described with reference to the accompanying drawings. First is described, an emoticon input method to a portable information processing terminal (hereinafter, simply called "information processing terminal") such as a mobile phone, a tablet terminal, or the like. There are mainly two emoticon input methods. In the embodiment, an emoticon corresponds to an emoji as called in Japan, and is distinguished from a face mark represented by a combination with multiple symbols such as :-),:-<, and the like.

First, a first emoticon input method is to select the emoticon by changing an input mode. FIG. 1A and FIG. 1B are diagrams for explaining the first emoticon input method. In FIG. 1A, a character input screen 1a is illustrated in a case in which an Operating System (OS) of the information processing terminal is Android (registered trademark).

The character input screen 1a includes an edit area 2a for editing text, and a selection area 2b for displaying a list character shapes available to input with an input mode 2c being selected. There are various input modes 2c such an emoticon mode, a symbol mode, a face mark mode, and the like, each being displayed with tabs.

The emoticon mode may correspond to a mode for a user to select and input one of multiple emoticons 9 being prepared beforehand. Each of the emoticons 9 is depicted as a facial shape representing a different emotion. The symbol mode may correspond to a mode for the user to select and input one of multiple symbols such as an equation (=), inequality signs (<, >), various units (%, Y, &, etc.), and the like. The face mark mode may correspond to a mode for the user to select a combination from a list of multiple symbol combinations ((^^), (≥0≤)), etc.) representing various emotions.

When the user of the information processing terminal selects a tab "EMOTICON" on the selection area 2b of the character input screen 1a with a finger 3, the emoticon mode is selected and a list of various emoticons 9 is displayed. When the user further selects one of the emoticons 9 from the list displayed in the selection area 2b with the finger 3, the emoticon 9 pointed at by the finger 3 is displayed in the edit area 2a.

In FIG. 1B, a character input screen 1b in a case in which the OS of the information processing terminal is iOS (registered trademark) is illustrated. The character input screen 1b includes an edit area 2e for editing text, and a selection area 2f for displaying a list of character shapes available to input in a selected one of input modes 2g. The input modes 2g may correspond to the emoticon mode, the symbol mode, the face mark mode, and the like, and be displayed by icons representing these modes for the user to select one mode.

When the user selects one icon for the emoticon mode on the selection area 2f of the character input screen 1b with the finger 3, the emoticon mode is selected and the list of the various emoticons 9 is displayed. When the user further selects one of the various emoticons 9 in the list displayed in the selection area 2f with the finger 3, the emoticon 9 being selected is displayed in the edit area 2e.

A second emoticon input method is a method which converts into the emoticon 9 representing emotion in response to an input of a character string representing the emotion such as happy, joyful, anger, or the like. In Japan, a kana kanji conversion corresponds to the second emoticon input method. The kana kanji conversion is one of conversion examples to retrieve and display one or more emoticons 9 and various words having a similar pronunciation in various signage systems such as Hiragana, Katakana, Kanji, and the like in response to the character string being input by the user.

Figure 2A:
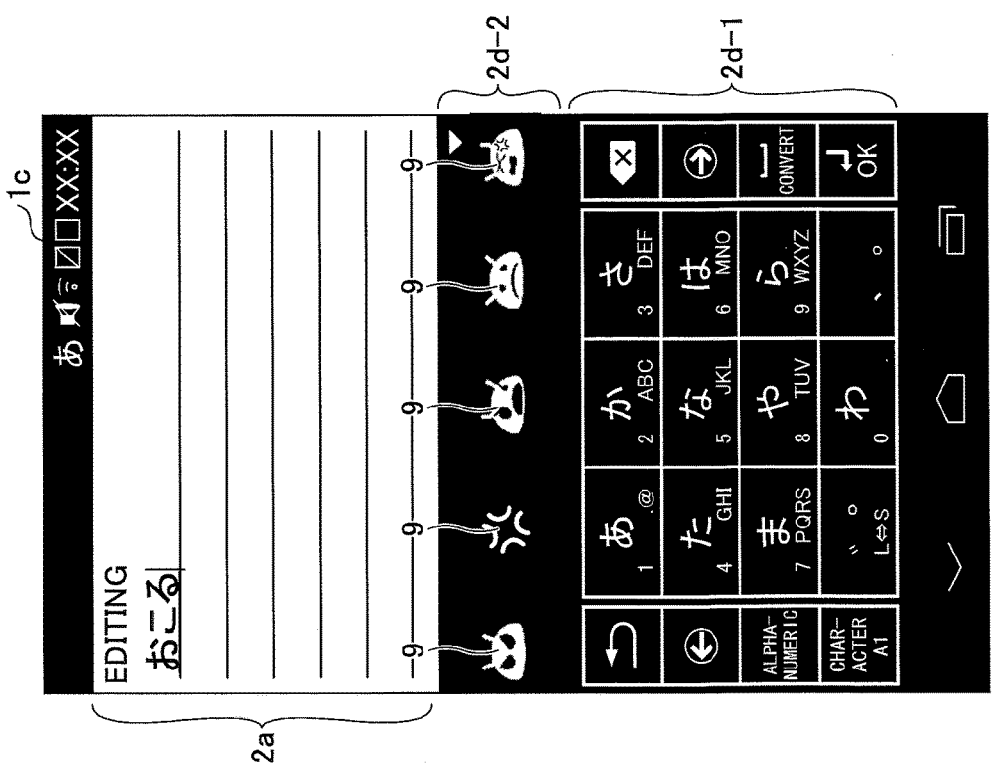

FIG. 2A and FIG. 2B are diagrams for explaining the second emoticon input method. FIG. 2A illustrates a character input screen 1c in a case in which the OS of the information processing terminal is Android.

The character input screen 1c includes an edit area 2a for editing text, a software key display area 2d-1, and a candidate display area 2d-2 for displaying candidates corresponding to the character sequence input by the user in the software key display area 2d-1.

In response to the character sequence which the user selects and inputs a character in the software key display area 2d-1 of the character input screen 1c, candidates are displayed in the candidate display area 2d-2. The emoticons 9 and words are included in the candidates being displayed. In this example, in response to an input of a character string "おこる" ("Okoru" in Japanese means "anger" in English), the various emoticons 9 representing an anger emotion are listed in the candidate display area 2d-2. The user selects one emoticon 9 or one word from the candidate display area 2d-2.

In FIG. 2B, the character input screen 1d is illustrated in a case in which the OS of the information processing terminal is iOS. The character input screen 1d includes the edit area 2e, the software key display area 2h-1, a candidate display area 2h-2 which displays the candidates corresponding to the character string input by the user in the software key display area 2h-1.

The candidates are displayed in the candidate display area 2h-2 in response to the character string which the user selects and inputs characters by using the software key display area 2h-1 of the character input screen 1d. The candidates include the emoticons 9 and words. In this example, in response to an input of the character string "おこる" ("anger" in English), the various emoticons 9 representing the anger emotion are listed and displayed in the candidate display area 2h-2. The user selects one emoticon 9 or one word from the candidate display area 2h-2.

Figure 3:
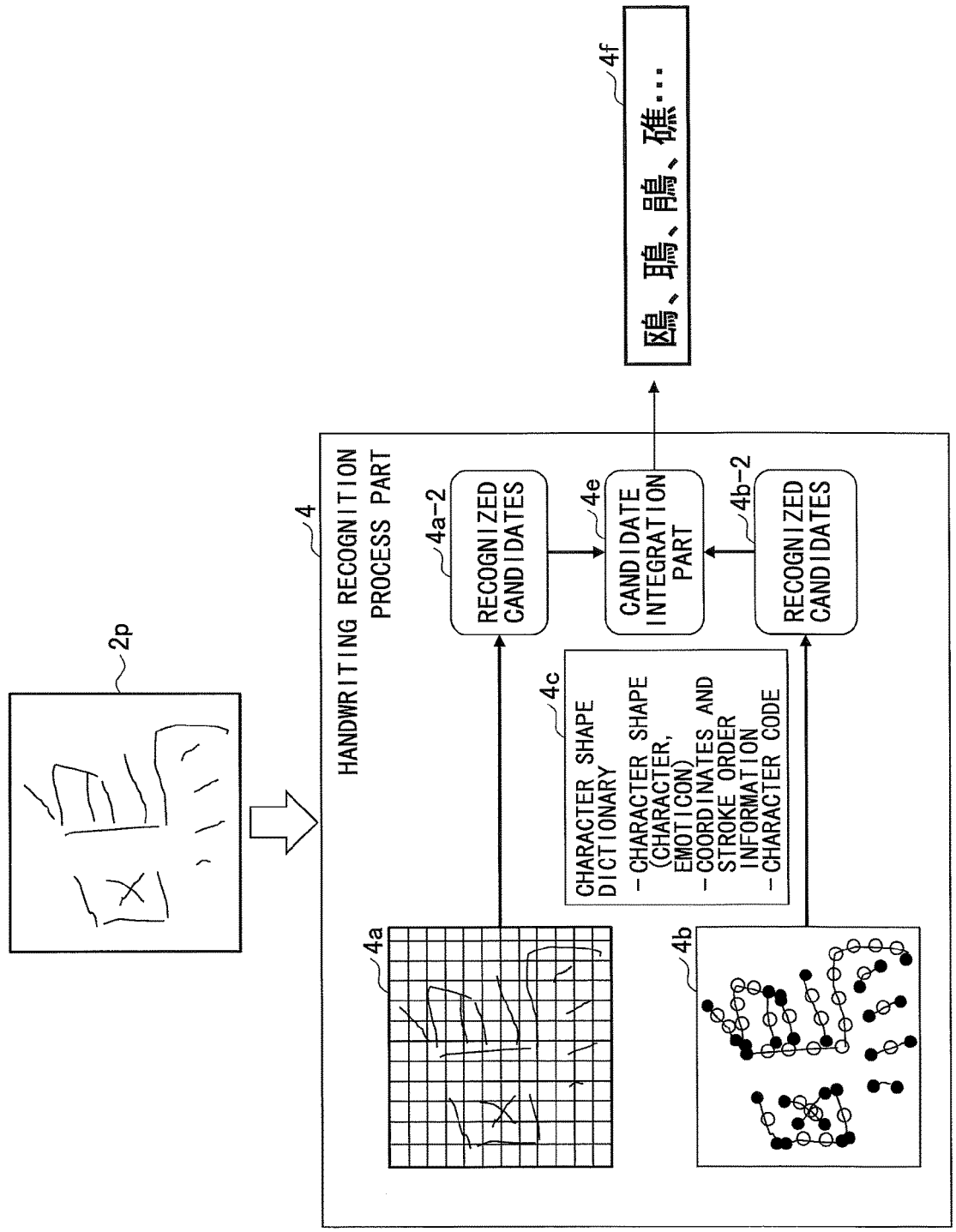
FIG. 3 is a diagram illustrating an example of the handwriting character recognition process.

Next, a handwriting recognition process will be described. By the handwriting recognition process, a handwritten character and the like are converted into text. FIG. 3 is a diagram illustrating an example of the handwriting character recognition process. In FIG. 3, the handwriting character recognition process part 4 perform the handwriting recognition process when being called from an application of the information processing terminal such as electronic mail, a scheduler, a memo pad, or the like.

When the user writes a character "鷗" ("Kamome" in Japanese means "gull" in English) in a handwriting input area 2p of the information processing terminal by handwriting, the handwriting recognition process part 4 acquires character shape information 4a and stroke information 3b of a character "鷗" ("gull" in English) being input in the input area 2p, and obtains recognition candidates 4a-2 and 4b-2 the character shape information 4a and the stroke information 4b respectively. A candidate integration part 4e integrates the recognition candidates 4a-2 and 4b-2, and outputs the recognition candidate 4f. The recognition candidate 4f is reported as a returned value to a caller of the handwriting recognition process.

A character shape dictionary 4c generally includes character shapes for each of characters, the emoticons 9, and the like, coordinates and an order for lines, dots, and the like in one character, and character codes.

The character shape information 4a may be information indicating the shape of the character, and is created from font data of a bitmap. In a case of the character to which the character code is assigned, it is possible to create the character shape information 4a.

The stroke information 4b may be information indicating the stroke order for each of the characters. The order of the character is roughly ruled from right to left and from top to bottom. In fact, differences among individuals exist. Accordingly, as illustrated in FIG. 4, multiple persons being tested such as Mr. Abc, Mr. Def, . . . , and Mr. Xyz may be requested to input the same character "鷗" ("gull" in English). The stroke information 4b is acquired for each of the multiple persons, multiple sets of the stroke information 4b acquired are integrated and edited, and the stroke information 4b being standard is created for the character "鷗" ("gull" in English).

Next, the character shape and the stroke (the stroke order) of the emoticon 9 will be considered. Regarding the character shape of the emoticon 9, among similar emotional expressions and different emotional expressions, various similar shapes exist.

Figure 5A:
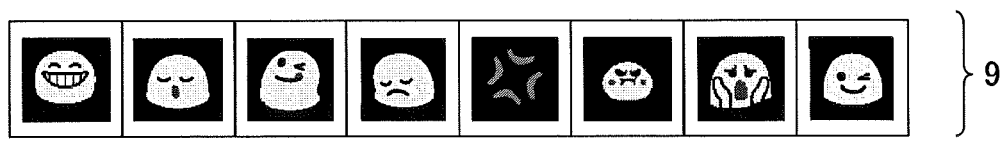
FIG. 5A and FIG. 5B are diagrams illustrating examples of emoticons.
Figure 5B:
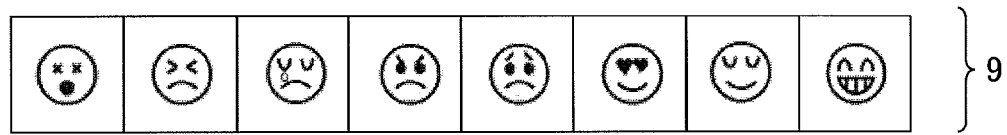

FIG. 5A and FIG. 5B are diagrams illustrating examples of the emoticons 9. In each of FIG. 5A and FIG. 5B, eight emoticons 9 include similar emotional expressions and different emotional expressions, and may be drawn by a similar outline.

Next, regarding strokes of the emoticon 9, FIG. 6A through FIG. 6D are diagrams for explaining input examples of the emoticon 9. FIG. 6A illustrates the emoticon 9 which the user inputs. FIG. 6B through FIG. 6D depict handwriting examples of the emoticon 9 in FIG. 6A performed in a character input screen 1 which are input by handwriting by different users at their information processing terminals. The emoticon 9 in FIG. 6A expresses an emotion of a person who is frightened.

The character input screen 1 includes the edit area 2a, the candidate display area 2d-2, a handwriting input area 2d-3. Based on a character handwritten by the user using the finger 3 in the handwriting input area 2d-3, characters as input candidates are displayed in the candidate display area 2d-2.

In the candidate display area 2d-2, the character or the emoticon 9 which is determined as a likelihood by the handwriting recognition process part 4 is displayed at the most left. A character at the most right is determined as having lower coincidence by the handwriting recognition process part 4.

In a handwriting example in FIG. 6B, the emoticon 9 is outlined. Eyes and mouth are drawn and hands are represented by round shapes. In a handwriting example in FIG. 6C, a face of the emoticon 9 is outlined. The eyes and mouth are drawn, and the hands are represented by lines. In a handwriting example in FIG. 6D, there is no outline of the emoticon 9. The eyes and mouth are drawn and hands are represented by the round shapes.

In addition, there is no drawing order for an outline of a face, the eyes and mouth, and the hands. The outline of the face may be drawn first, may be drawn at last, or the like.

For the emoticon 9, there is no such rule like the stroke order of the character from right to left and from top to bottom. The emoticon 9 may be drawn from an outside to a center, or from the center to the outside. A rough rule similar to the stroke order of the character does not exist.

Accordingly, it is difficult to acquire sufficient accuracy by using the character shape information 4a and the stroke information 4b described above. A recognition result may be actually different from the emoticon 9 which the user intends to input. Hence, a recognition is likely to be in error at a higher possibility.

Referring to FIG. 6B, different emoticons 9 are listed but the one as the emoticon 9 in FIG. 6A is not listed in the candidate display area 2d-2. Referring to FIG. 6C, the one as the emoticon 9 is listed but is positioned as seventh from left in the candidate display area 2d-2. Referring FIG. 6D, the one as the emoticon 9 is positioned as fifth from left in the candidate display area 2d-2. It is difficult to acquire sufficient accuracy by the character shape and the strokes of the emoticon 9.

Also, as described in FIG. 5, multiple emoticons 9 have a similar shape. The multiple emoticons 9 having different emotional expressions may be listed as candidates in the candidate display area 2d-2.

The emoticons 9 aim to express emotions of users. However, as described above, in the handwriting recognition process using the character shape information 4a, the stroke information 4b, and the character shape dictionary 4c, the emotional expression is not considered. The inventor thought that it would be possible to improve character recognition accuracy of the emoticon 9 if the emotion which the user attempts to express is specified based on the character string which has been recognized in the handwriting recognition process.

In the embodiment, the emotional expression is specified based on a sentence (the character string) being input, and the emotional expression, which is specified when the emoticon 9 being input with the sentence, is recognized, so as to improve recognition accuracy of the emoticon 9.

Figure 7:
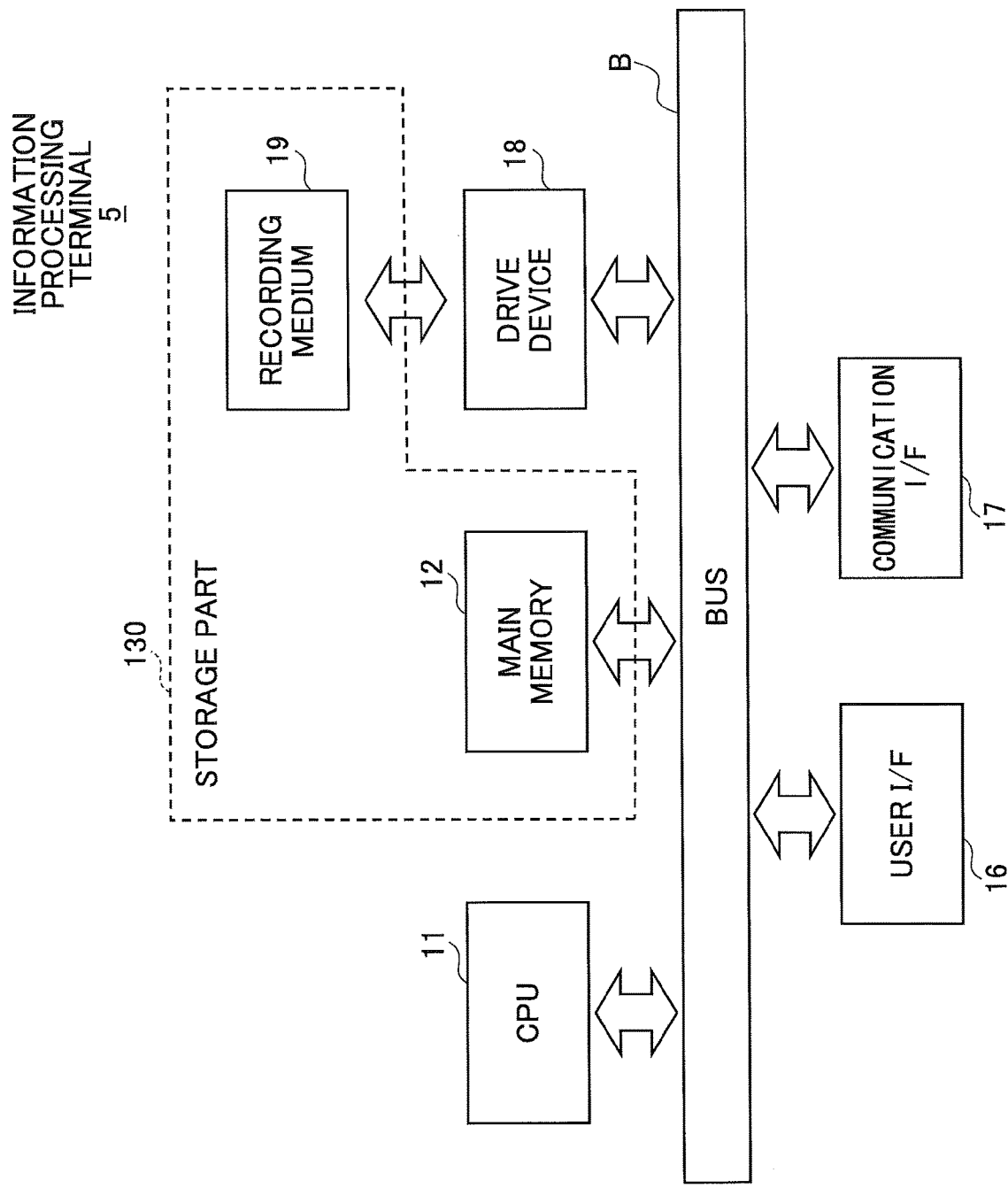
FIG. 7 is a block diagram illustrating a hardware configuration of an information processing terminal.

FIG. 7 is a block diagram illustrating a hardware configuration of an information processing terminal 5 in the embodiment. In FIG. 7, the information processing terminal 5 is a terminal such as a tablet type terminal, a mobile phone or the like which is controlled by a computer, and includes a Central Processing Unit (CPU) 11, a main memory 12, a user InterFace (I/F) 16, a communication I/F 17, and a drive device 18, which are connected via a bus B.

The CPU 11 corresponds to a processor and controls the information processing terminal 5 in accordance with programs stored in the main memory 12. The main memory 12 may include a Random Access Memory (RAM), a Read Only Memory (ROM), and the like, and may store or temporarily retain programs executed by the CPU 11, data for a process by the CPU 11, data acquired in the process by the CPU 11, and the like. The programs stored in the main memory 12 are executed by the CPU 11, and various processes are realized.

The user I/F 16 displays various information items under control of the CPU 11, and may be a touch panel or the like which allows the user to operate on a screen. Communications by the communication I/F 17 are not limited to wireless communication or wired communication.

The programs realizing the process in the information processing terminal 5 may be downloaded through a network. Alternatively, the programs may be stored in the main memory 12 of the information processing terminal 5 beforehand.

The drive device 18 interfaces a recording medium 19 (which may be a non-transitory (or tangible) computer-readable recording medium such as a secure digital (SD) card or the like), which is set into the drive device 18, with the information processing terminal 5. The main memory 12 and/or the recording medium 19 correspond to a storage part 130, and store various data sets, tables, and the like which will be described later.

Figure 8:
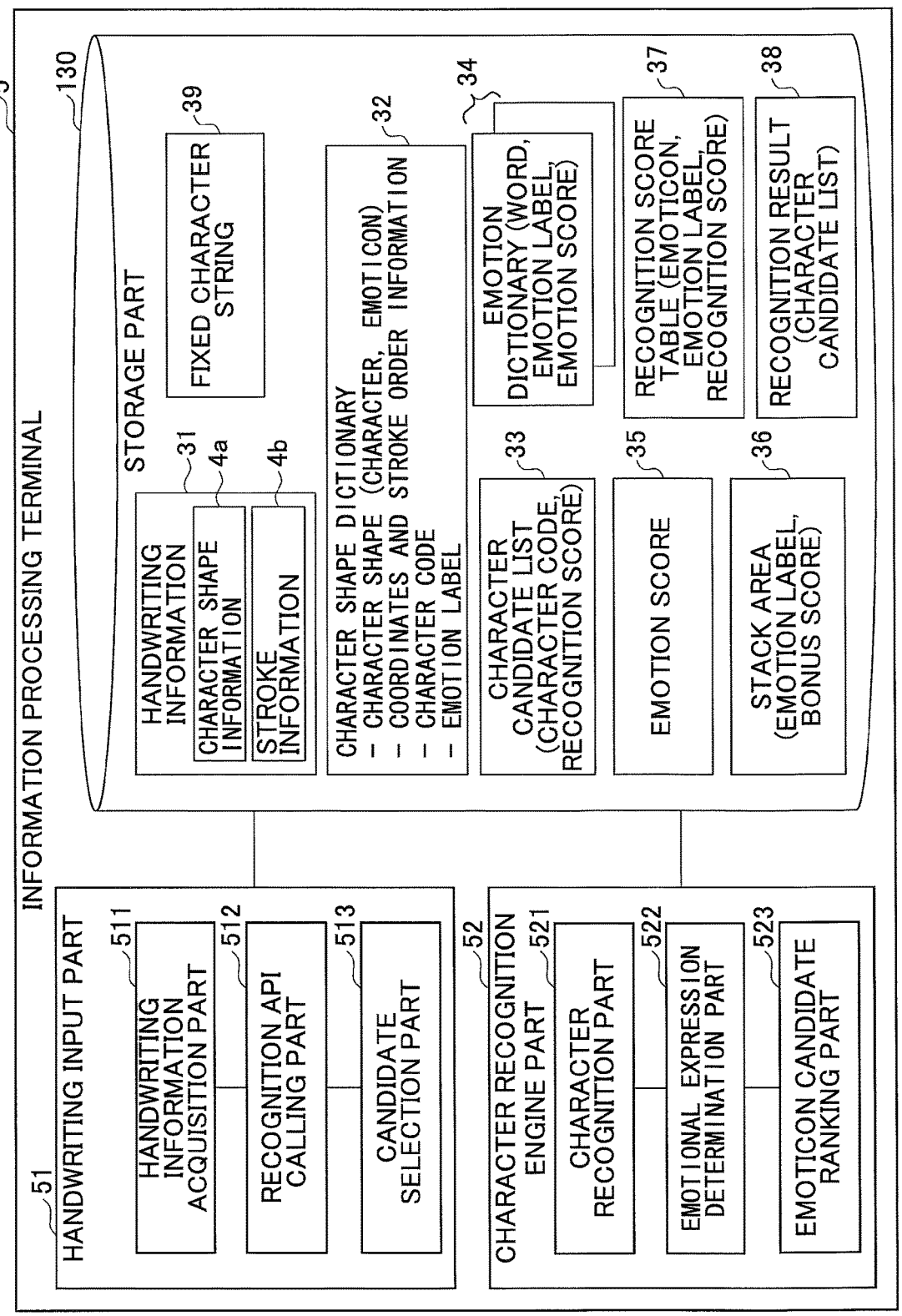
FIG. 8 is a block diagram illustrating a first functional configuration example of the information processing terminal.

FIG. 8 is a block diagram illustrating a first functional configuration example of the information processing terminal 5. In FIG. 8, the information processing terminal 5 mainly includes a handwriting input part 51, and a character recognition engine part 52. The handwriting input part 51 and the character recognition engine part 52 are realized by respective processes by the CPU 11 executing corresponding programs. The information processing terminal 5 may correspond to a conversion apparatus which converts a user's input of a sentence in an editing area into the character or the emoticon 9.

The storage part 130 stores handwriting information 31 including the character shape information 4a and the stroke information 4b, a character shape dictionary 32, a character candidate list 33, an emotion dictionary 34, an emotion score 35, a stack area 36, a recognition score table 37, a recognition result 38, a fixed letter string 39, and the like.

The handwriting input part 51 is regarded as a process part which provides an interface concerning a handwriting input of the user, and includes a handwriting information acquisition part 511, a recognition Application Interface Program (API) calling part 512, and a candidate selection part 513.

The handwriting information acquisition part 511 analyzes the character handwritten by the user in the input area 2d-3 of the character input screen 1, and acquires the character shape information 4a and the stroke information 4b. The handwriting information 31 including character shape information 4a and the stroke information 4b, which are acquired, are stored in the storage part 130.

The recognition API calling part 512 calls the character recognition engine part 52 via an API.

The candidate selection part 513 displays the recognition result 38, which is the returned value from the character recognition engine part 52, as a list of candidates in the candidate display area 2d-2, and adds the emoticon 9 or the character selected by the user to a fixed character string 39.

The character recognition engine part 52 is regarded as a process part which performs the handwriting recognition in response to a call from the handwriting input part 51. The character recognition engine part 52 corresponds to a conversion candidate generation part which generates conversion candidates by recognizing the handwriting input of the user. Also, the character recognition engine part 52 includes a character recognition part 521, an emotional expression determination part 522, and an emoticon candidate ranking part 523.

The character recognition part 521 performs the handwriting recognition process based on the handwriting information 31 by referring to the character shape dictionary 32. By the handwriting recognition process, a recognition score indicating a consistency degree with the handwriting input is calculated. The character candidate list 33 indicating the characters and/or the emoticons 9 to be candidates, which are determined by the handwriting recognition process, is stored in the storage part 130. The character candidate list 33 is regarded as a list which indicates character codes and recognition scores.

The emotional expression determination part 522 retrieves a word associated with the emotional expression by referring to the emotion dictionary 34 from the fixed character string 39 including the character string being input. The emotional expression determination part 522 acquires the emotion score 35 of the retrieved word, and acquires an emotion label by referring to the emotion dictionary 34 again based on the emotion score 35 being acquired. The emotional expression determination part 522 acquires a bonus score by a predetermined method based on the emotion score 35 or the emotion label, and stores the acquired emotion label and bonus score to the stack area 36.

The emoticon candidate ranking part 523 adjusts the recognition score of a emoticon candidate in the character candidate list 33 by using the bonus score stored in the stack area 36. Specifically, for each of the emoticons 9 in the character candidate list 33, the emoticon candidate ranking part 523 creates the recognition score table 37 in which the emotion label and the recognition score are associated with each other, and deducts the bonus score from the recognition score of each of the emoticons 9 having emotion labels other than the emotion label acquired by the emotional expression determination part 522. By adjusting the recognition scores of the emoticons 9 having the emotion labels different from the emotion label acquired by the emotional expression determination part 522, it is possible to suppress displaying unwanted candidates.

The emoticon candidate ranking part 523 outputs the recognition result 38 after the adjustment, in which ranks of the emoticon candidates are changed based respective recognition scores, to the storage part 130. The recognition result 38 includes a candidate list in which the emoticon candidates are sorted based on the respective recognition scores after adjustment. The recognition result 38 is reported as the returned value to the recognition API calling part 512 of the handwriting input part 51 which is a calling originator with respect to the character recognition engine part 52.

The handwriting information 31 includes the character shape information 4a and the stroke information 4b (FIG. 3) which are acquired as a result from analyzing a handwritten character by the handwriting information acquisition part 511.

In the character shape dictionary 32 in the embodiment, an item of the emotion label is additionally provided as well as items of the character shapes (for the character, the emoticons 9, and the like) of the character shape dictionary 4c, the coordinates and stroke order information, and the character codes.

The character candidate list 33 lists, based on the handwriting information 31, character candidates and the emoticon candidates which are similar to the handwritten character by the user. In the character candidate list 33, the character code, the recognition score, and the like are associated with each of candidates.

The emotion dictionary 34 may be a data file or a database which indicates a correspondence relationship between each of words associated to emotional expression and the emotion expressed by the word. Here, it is considered that a word expressing a certain emotion is likely to co-occur with an emotional word group implying the certain emotion, and is not likely to co-occur with an emotional word group implying an opposite emotion (refer to Tadahiko Kumamoto et al., "Emotion Dictionary"). The emotion label in the embodiment corresponds to an emotional word in the "Emotion Dictionary", the emotional score in the embodiment corresponds to a numeral value in the "Emotion Dictionary", which indicates a degree of co-occurrence between two emotional words expressing contrastive emotions.

The emotion score 35 indicates a possibility for a word associated with the emotional expression retrieved from the fixed character string 39 to express the certain emotion. The emotion score 35 is acquired by the emotional expression determination part 522 using a predetermined calculation.

The stack area 36 is regarded as an area which stores the emotion label and the bonus score which are determined by the emotional expression determination part 522.

The recognition score table 37 is regarded as a table in which the emotional label and the recognition score are associated with each of the emoticons 9 which are retrieved from the character and/or the emoticons 9 listed in the character candidate list 33. The emotion label may be associated with each of the emoticons 9 by referring to the character shape dictionary 32 in the embodiment.

The recognition result 38 may be data which lists the candidates including the character candidates and the emoticon candidates in an ascending order after the emoticon candidate ranking part 523 changes a candidate order of the emoticons 9.

The fixed character string 39 may be data which indicates the character string selected and input by the user from the recognition result 38.

FIG. 9 is a diagram illustrating a data example of the character shape dictionary 32 in the embodiment. In FIG. 9, the character shape dictionary 32 in the embodiment may be a data file or the database in which for the emoticons 9, the emotion label is additionally provided as an item as well as the items of the character shape dictionary 4c in FIG. 3.

The character shape indicates a shape of the character or the emoticon 9, and may be data of the bitmap depicting the character or the emoticon 9. The coordinates and stroke information are regarded as information indicating coordinates of dots, lines, and the like in accordance with the stroke order concerning the character shape. For the character, the standard stroke order of the multiple persons being tested as described above in FIG. 4 is applied. The stroke order of the emoticon 9 is not basically defined, and may be broadly ruled similar to the character (from left to right and from top to bottom). The character code indicates a hexadecimal code assigned to the character shape.

The emotion label indicates the word expressing the emotion. For instance, the emotion label may indicate the word such as "anger", "happy", "sad", "frightened", or the like.

Figure 10:
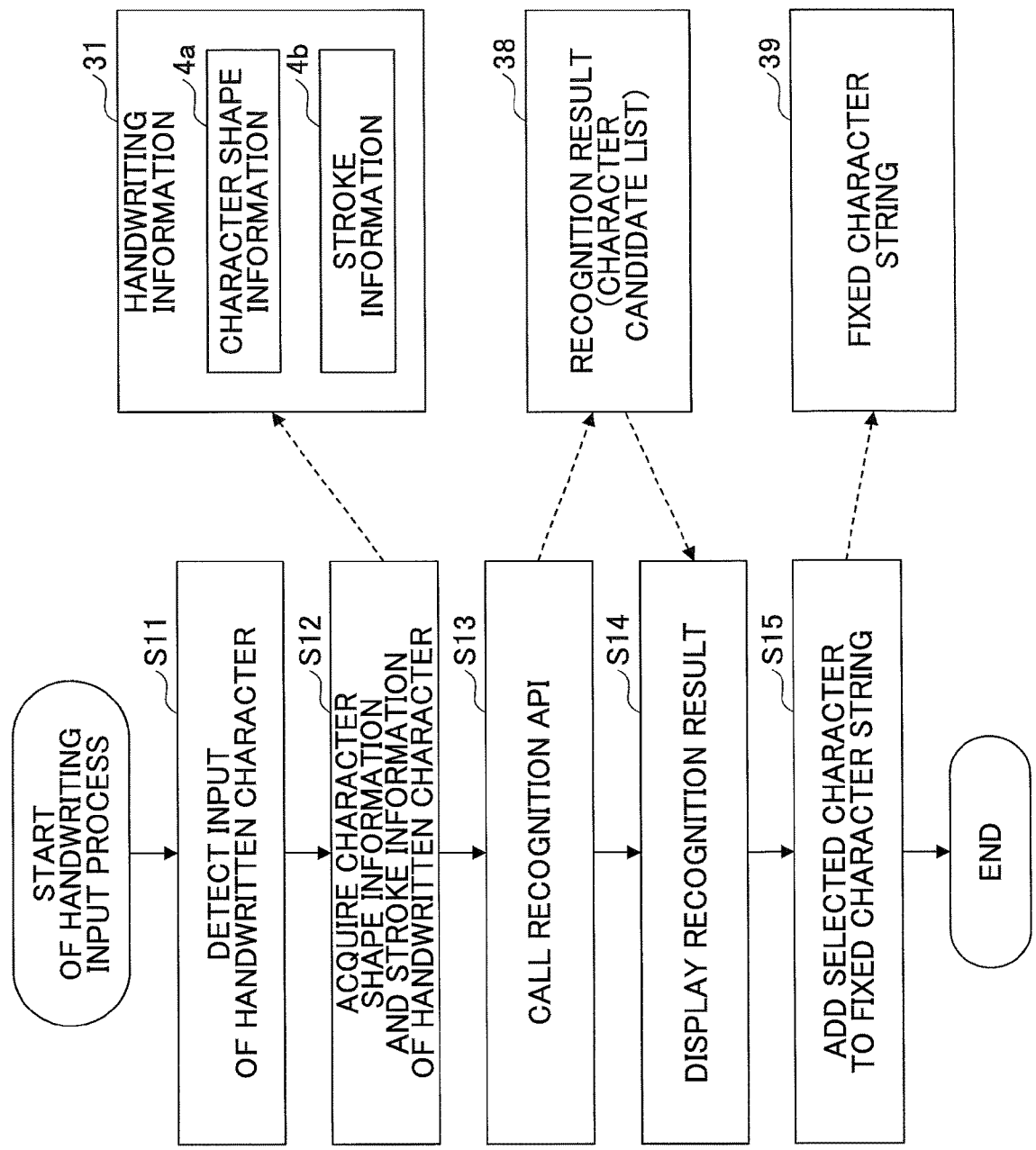
FIG. 10 is a flowchart for explaining a handwriting input process performed by a handwriting input part in the first functional configuration example in FIG. 8.

FIG. 10 is a flowchart for explaining a handwriting input process performed by the handwriting input part 51 in the first functional configuration example in FIG. 8. In FIG. 10, when detecting an input of handwriting of the user in the handwriting input area 2d-3 of the character input screen 1 (step S11), the handwriting information acquisition part 511 of the handwriting input part 51 acquires the character shape information 4a and the stroke information 4b of a handwritten character (step S12). The handwriting information 31 including the character shape information 4a and the stroke information 4b are stored in the storage part 130.

After that, the recognition API calling part 512 calls the character recognition engine part 52 via the API (step S13). The character recognition process is performed by the character recognition engine part 52, and the recognition result 38 of the handwritten character is reported as the returned value.

Next, the candidate selection part 513 displays the characters, the emoticons 9, and the like to be the candidates in the candidate display area 2d-2 based on the recognition score of the recognition result 38 (step S14). After that, the candidate selection part 513 displays, in the edit area 2a, the character selected by the user from the candidate display area 2d-2, and also adds the selected character to the fixed character string 39 (step S15).

Figure 11:
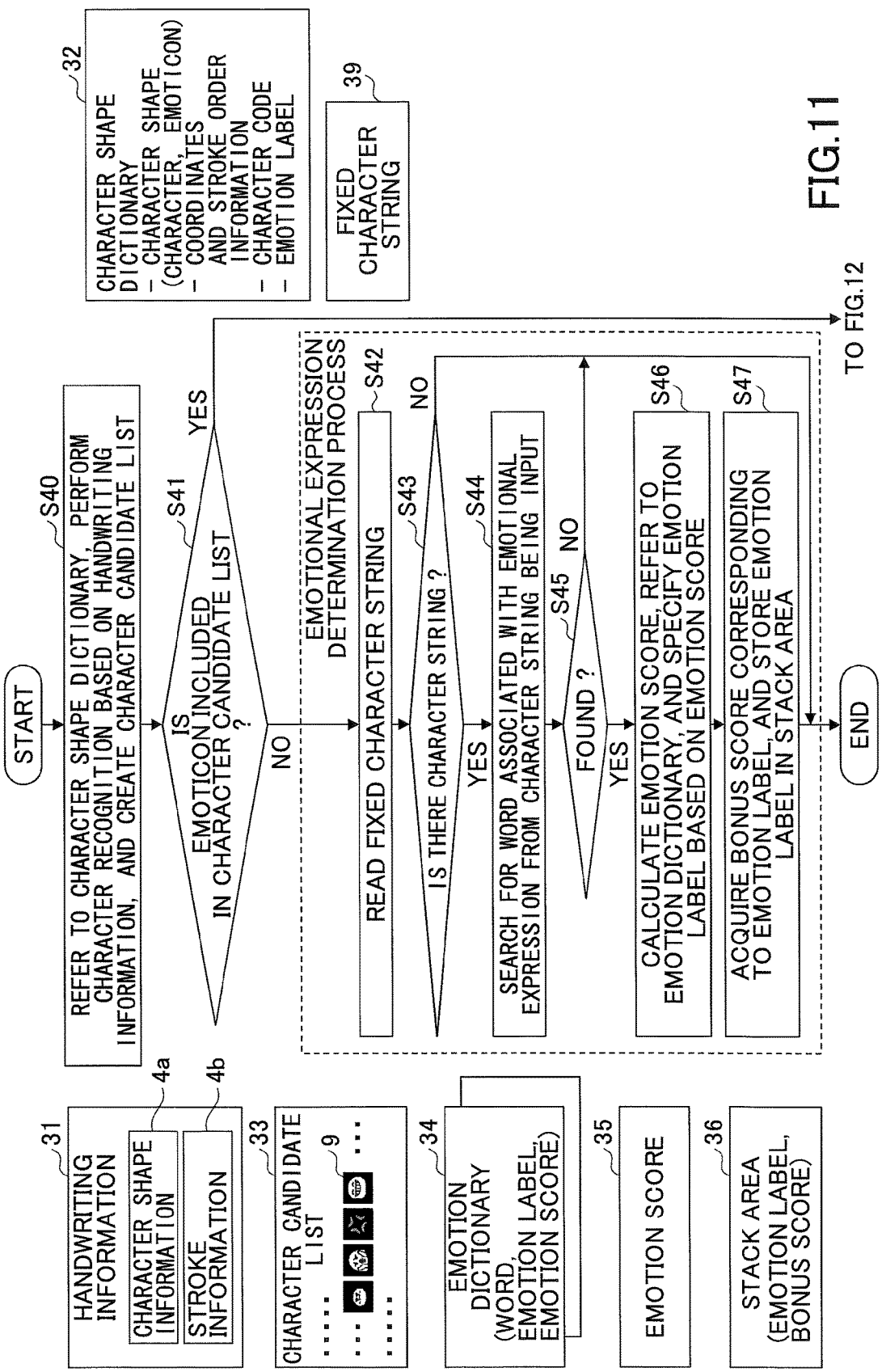
FIG. 11 is a flowchart for explaining the handwriting recognition process in the first functional configuration example in FIG. 8.
Figure 12:
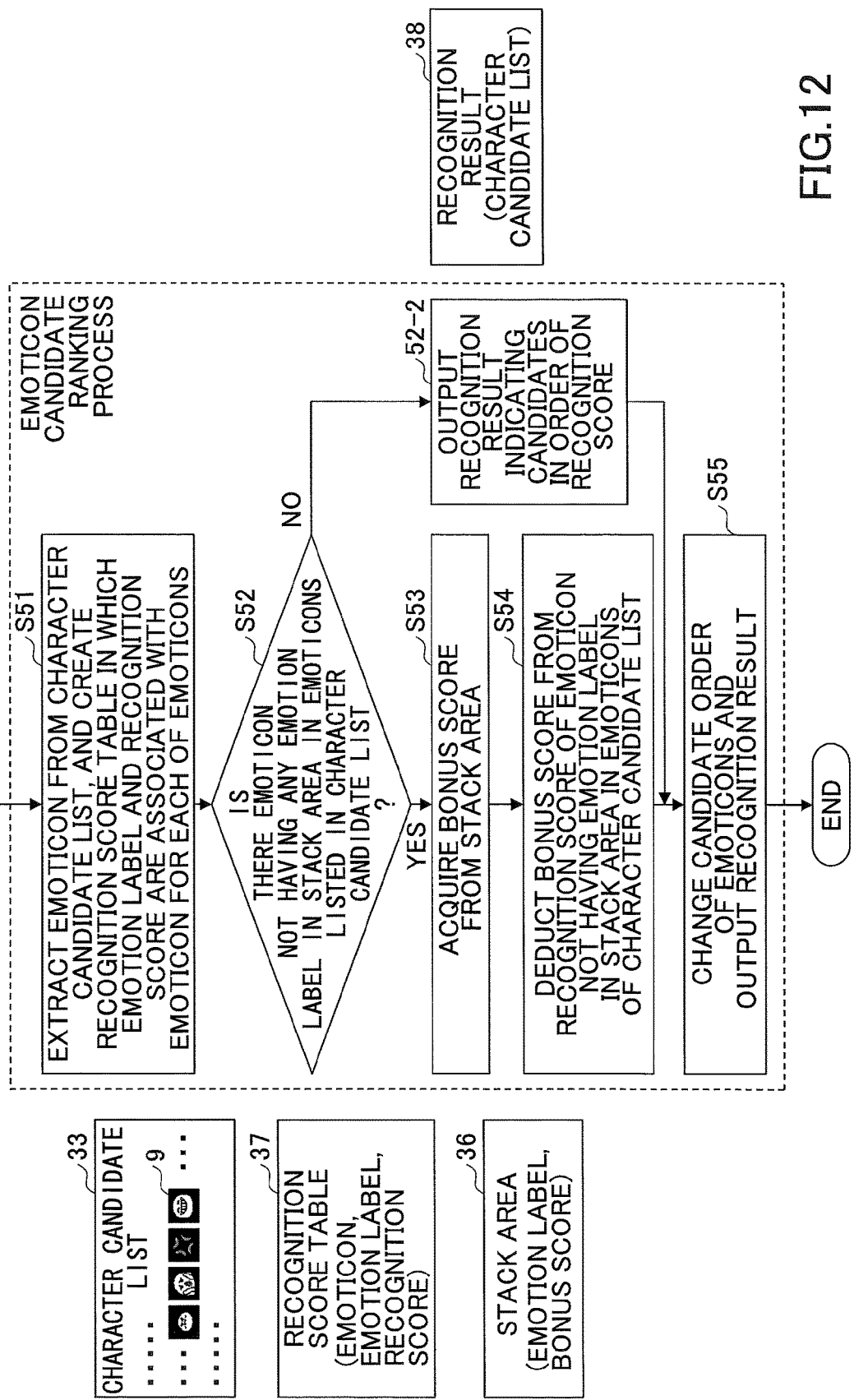
FIG. 12 is a flowchart for explaining the handwriting recognition process in the first functional configuration example in FIG. 8.

Next, a handwriting recognition process performed by the character recognition engine part 52 will be described. FIG. 11 and FIG. 12 are flowcharts for explaining the handwriting recognition process in the first functional configuration example in FIG. 8.

In FIG. 11, the character recognition part 521 of the character recognition engine part 52 refers to the character shape dictionary 32, conducts the character recognition based on the handwriting information 31, and creates the character candidate list 33 (step S40).

By referring to the character dictionary 32 by using the character code of the character candidate list 33, the character recognition part 521 determines whether the emoticon 9 is included as a candidate in the character candidate list 33 (step S41). When the emoticon 9 is included in the character candidate list 33, the emoticon candidate ranking part 523 performs an emoticon candidate ranking process (FIG. 12). When the emoticon 9 is not included in the character candidate list 33, the emotional expression determination part 522 performs an emotional expression determination process. The emotional expression determination process corresponds to steps S42 through S47.

The emotional expression determination part 522 reads the fixed character string 39 from the storage part 130 (step S42), and determines whether there is the character string which has been already input (step S43). When there is no character string which has been already input, the emotional expression determination part 522 terminates the emotional expression determination process.

On the other hand, when there is the character string which has been already input, the emotional expression determination part 522 searches for the word associated with the emotional expression from the character string being input (step S44). That is, for each of words existing in the fixed character string 39, it may be determined whether the word is registered in the emotional dictionary 34.

The emotional expression determination part 522 determines whether the word associated with the emotional expression is searched for and found (step S45). When the word associated with the emotional expression is not found in the fixed character string 39, that is, when there is no word associated with the emotional expression in the fixed character string 39, the emotional expression determination part 522 terminates the emotional expression determination process.

On the other hand, when the word associated with the emotional expression exists in the fixed character string 39, the emotional expression determination part 522 calculates the emotion score, refers to the emotion dictionary 34, and specifies the emotion label based on the emotion score (step S46).

Then, the emotional expression determination part 522 acquires the bonus score corresponding to the emotion label of the stack area 36 (step S47). The bonus score may be calculated based on the emotion score of the emotion label which is specified from the emotion dictionary 34. Alternatively, the bonus score may be prepared for each of the emotion labels, and the bonus score corresponding to the emotion label specified from the emotion dictionary 34 may be acquired.

Next, the emoticon candidate ranking part 523 performs the emoticon candidate ranking process. Steps S51 through S54 in FIG. 12 correspond to the emoticon candidate ranking process.

In FIG. 12, the emoticon candidate ranking part 523 retrieves the emoticon 9 from the character candidate list 33, and creates, in the storage part 130, the recognition score table 37 in which the emotion label and the recognition score are associated with each of the emoticons 9 (step S51). The emotion label is acquired by referring to the emotion dictionary 34. The recognition score is the same as one of the character candidate list 33.

After that, the emoticon candidate ranking part 523 refers to the recognition score table 37, and determines whether there is the emoticon 9 which does not have the emotion label of the stack area 36 in the emoticons 9 listed in the character candidate list 33 (step S52). When there is no emoticon 9 which does not have the emotion label of the stack area 36 in the character candidate list 33, the emoticon candidate ranking part 523 outputs the recognition result 38 which indicates the candidates in an order of the recognition score (step S52-2).

On the other hand, when the character candidate list 33 includes the emoticon 9 not having the emotion label of the stack area 36, the emoticon candidate ranking part 523 acquires the bonus score from the stack area 36 (step S53).

After that, the emoticon candidate ranking part 523 deducts the bonus score from the recognition score of the emoticon 9 not having the emotion label of the stack area 36 (step S54), and changes the candidate order of the emoticons 9 based on the recognition scores resulting from the adjustment (step S55). Then, the character recognition engine part 52 terminates the handwriting recognition process.

Figure 13:
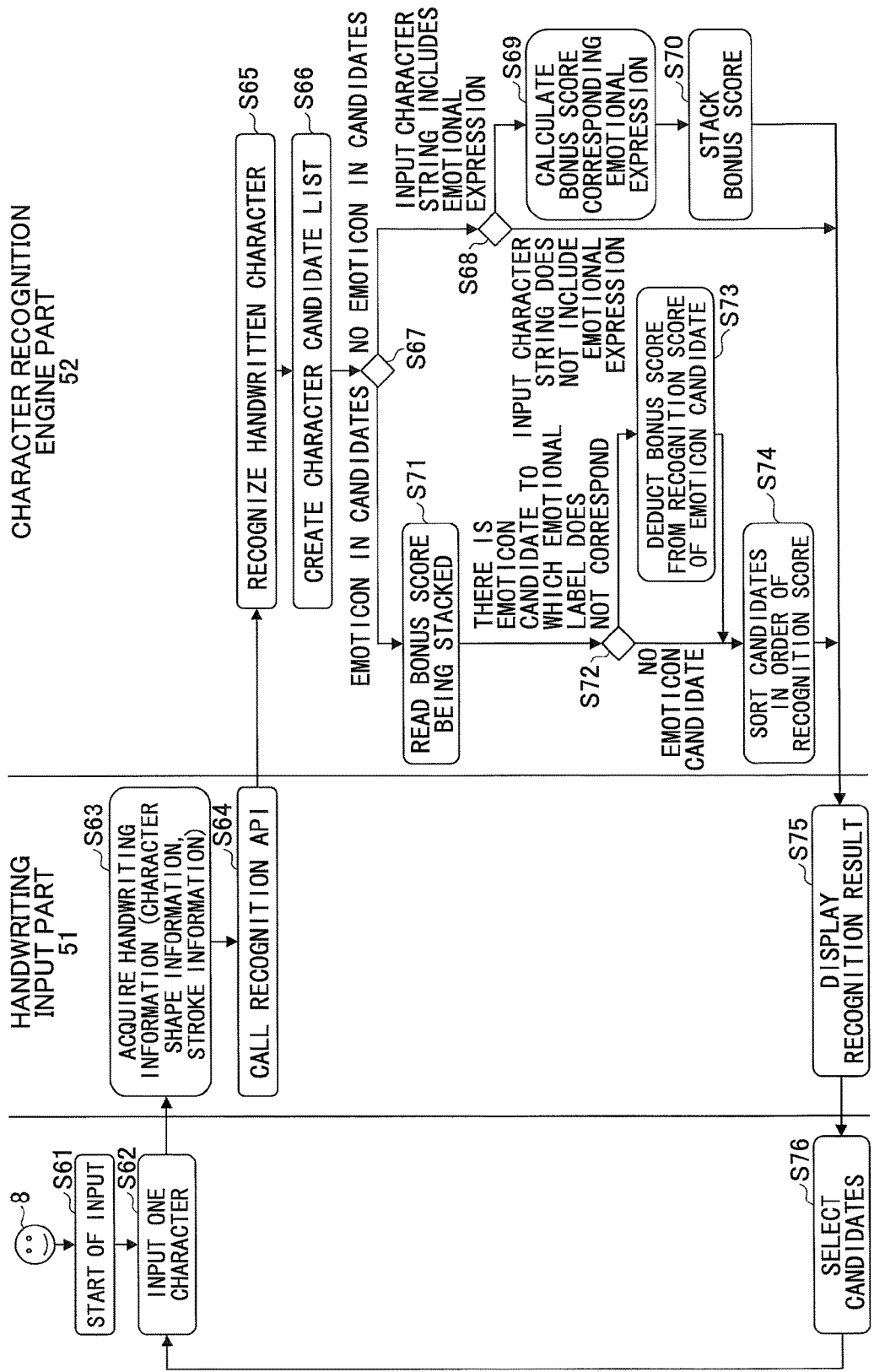
FIG. 13 is a diagram illustrating a process sequence in the first functional configuration example in FIG. 8.

FIG. 13 is a diagram illustrating a process sequence in the first functional configuration example in FIG. 8. In FIG. 13, a user 8 starts input to the character input screen 1 (step S61), and inputs one character (step S62).

The handwriting information acquisition part 511 of the handwriting input part 51 acquires the handwriting information 31 (the character shape information 4a and stroke information 4b) (step S63), and the recognition API calling part 512 calls the character recognition engine part 52 via the API (step S64).

In the character recognition engine part 52, the character recognition part 521 recognizes the handwritten character by using the handwriting information 31 (step S65), and creates the character candidate list 33 (step S66). The character recognition part 521 refers to the character shape dictionary 32 by using the character code of the character candidate list 33, and determines whether the character candidate list 33 includes the emoticon 9 as the candidate (step S67).

When the character candidate list 33 does not include the emoticon 9, the emotional expression determination part 522 starts the emotional expression determination process. The emotional expression determination part 522 determines whether there is the word associated with the emotional expression in an input character string (step S68). When there is the word associated with the emotional expression, the emotional expression determination part 522 calculates the bonus score corresponding to the emotional expression related to the word (step S69), and stacks the bonus score (step S70). The character recognition engine part 52 terminates its process.

On the other hand, when the emoticon 9 exists as the candidate, the emoticon candidate ranking part 523 performs the emoticon candidate ranking process. The emoticon candidate ranking part 523 reads the bonus score stacked in the stack area 36 (step S71), and determines whether there is the emoticon candidate which does not correspond to the emotion label stacked in the stack area 36, in the emoticon candidates (step S72).

When the emoticon candidate which does not correspond to the emotion label does not exist, the emoticon candidate ranking part 523 advances to step S74. When there is the emoticon candidate which does not correspond to the emotion label, the emoticon candidate ranking part 523 deducts the bonus score from the recognition score of the emoticon candidate (step S73).

The emoticon candidate ranking part 523 sorts the emoticon candidates in accordance with the recognition score (step S74). After the recognition result 38 is reported to the handwriting input part 51, the character recognition engine part 52 terminates its process.

The candidate selection part 513 of the handwriting input part 51 displays the character candidates and/or the emoticon candidates in the candidate display area 2d-2 based on the recognition result 38 which is reported from the character recognition engine part 52 (step S75). The user 8 selects one candidate in the candidate display area 2d-2 (step S76). The process sequence goes back to step S62. When the user 8 inputs a next character (step S62), the above described process is repeated.

In the first functional configuration example, the emoticon candidate ranking process is performed by the character recognition engine part 52. Alternatively, the handwriting input part 51 may perform the emoticon candidate ranking process.

Figure 14:
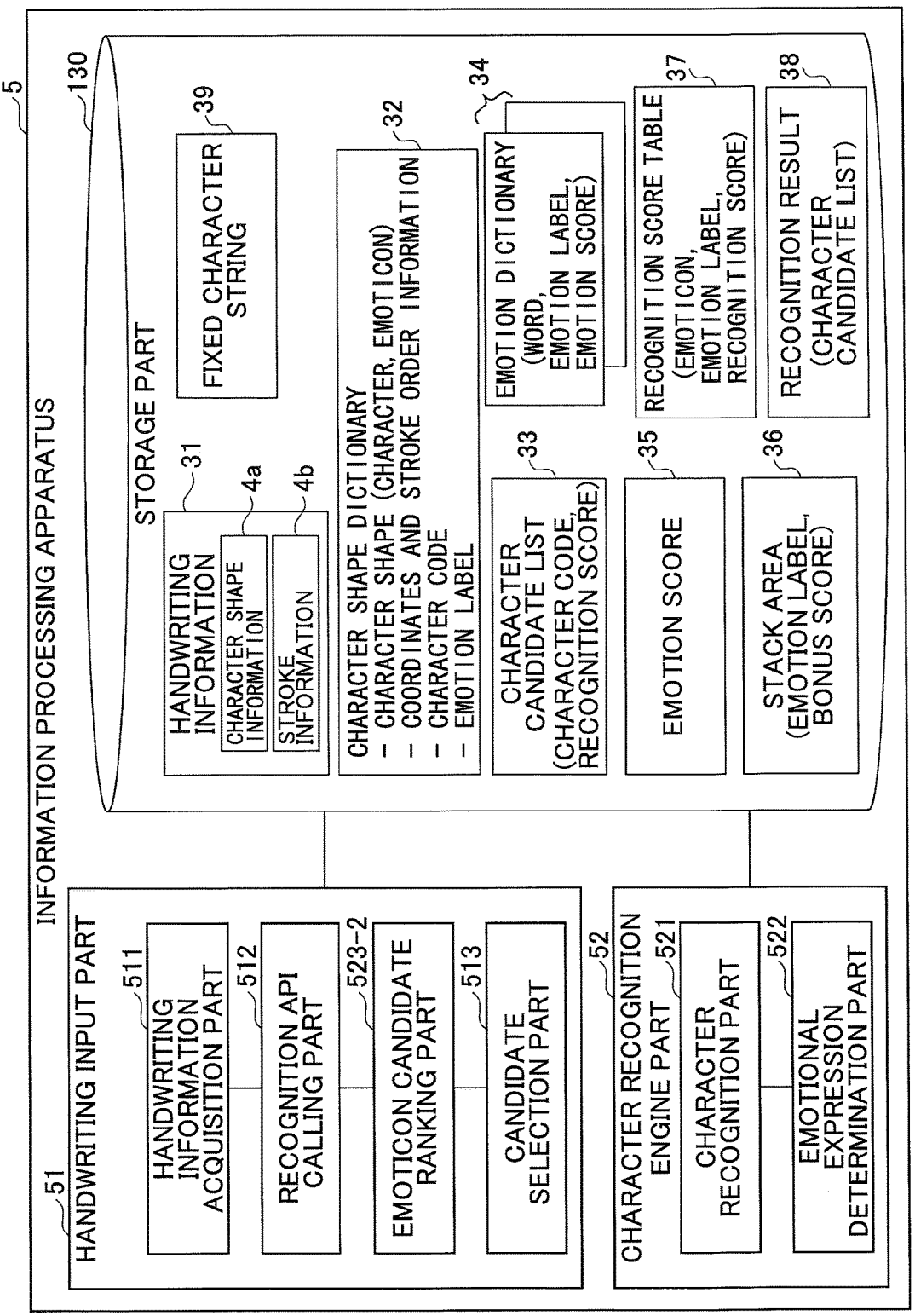
FIG. 14 is a diagram illustrating a second functional configuration example of the information processing terminal.

FIG. 14 is a diagram illustrating a second functional configuration example of the information processing terminal 5. In FIG. 14, the information processing terminal 5 mainly includes the handwriting input part 51, and the character recognition engine part 52. The handwriting input part 51 and the character recognition engine part 52 are realized by respective processes performed by the CPU 11 which executes corresponding programs.

The storage part 130 includes the handwriting information 31 including the character shape information 4a and the stroke information 4b, the character shape dictionary 32, the character candidate list 33, the emotion dictionary 34, the emotion score 35, the stack area 36, the recognition score table 37, the recognition result 38, and the like.

The handwriting input part 51 includes the handwriting information acquisition part 511, the recognition API calling part 512, an emoticon candidate ranking part 523-2, and the candidate selection part 513. The character recognition engine part 52 includes the character recognition part 521, and the emotional expression determination part 522.

Different from the first functional configuration example in FIG. 8, the handwriting input part 51 includes the emoticon candidate ranking part 523-2. Other process parts are the same as those in the first functional configuration example in FIG. 8, and the explanations thereof will be omitted.

When the recognition result 38 includes the emoticon 9, the emoticon candidate ranking part 523-2 adjusts the recognition score of the emoticon 9 by using the bonus scores stored in the stack area 36, and sorts the candidates in accordance with their recognition scores.

Figure 15:
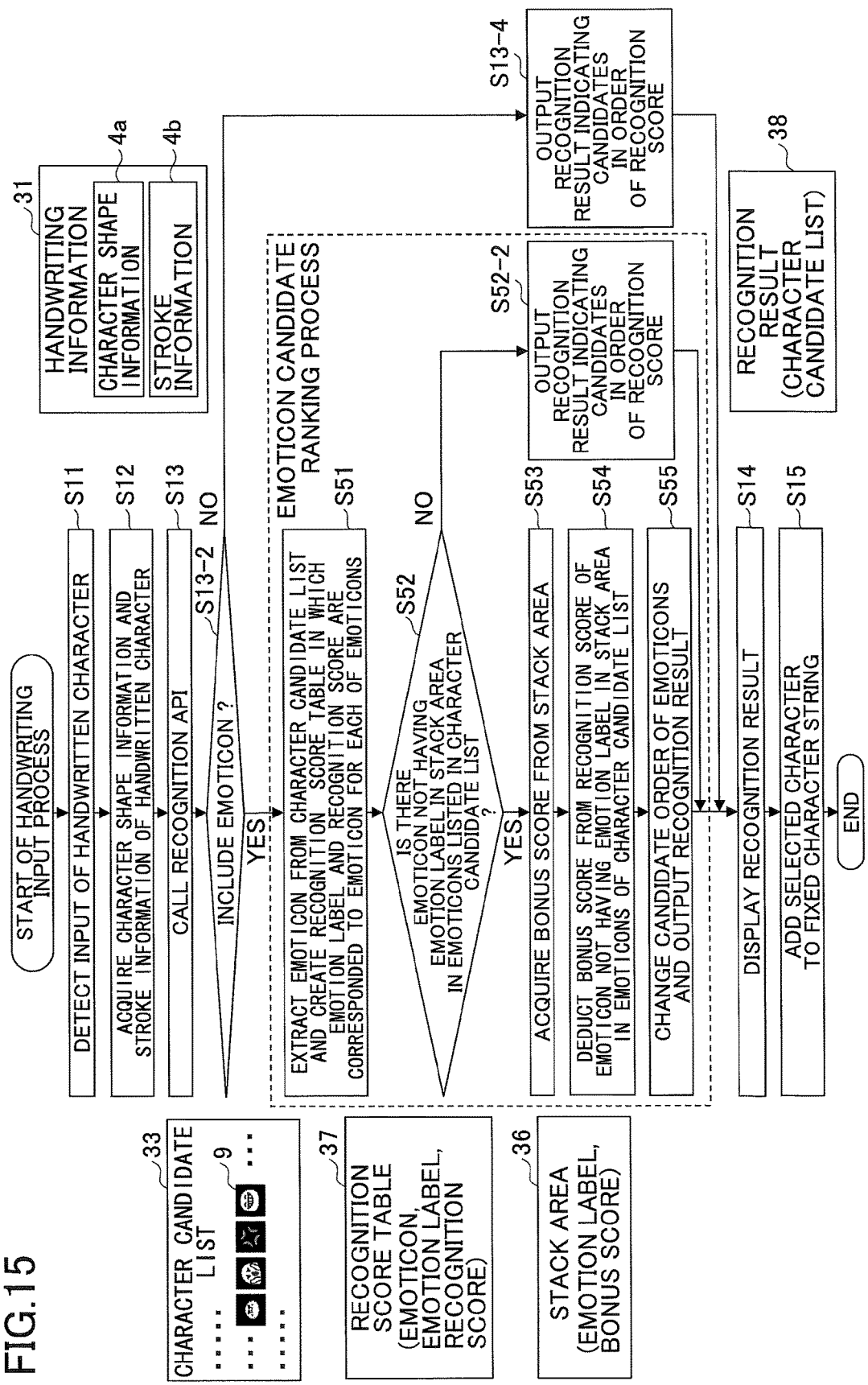
FIG. 15 is a flowchart for explaining a handwriting input process in the second functional configuration example in FIG. 14.

A handwriting input process performed by the handwriting input part 51 will be described. FIG. 15 is a flowchart for explaining the handwriting input process in the second functional configuration example in FIG. 14. In FIG. 15, steps that are the same as the ones in FIG. 10 and FIG. 12 are indicated by the same reference numerals.

In FIG. 15, the handwriting information acquisition part 511 of the handwriting input part 51 detects an input of handwriting of the user in the handwriting input area 2d-3 of the character input screen 1 (step S11), and acquires the character shape information 4a and the stroke information 4b of the handwritten character (step S12). The handwriting information 31 indicating the character shape information 4a and the stroke information 4b is stored in the storage part 130.

After that, the recognition API calling part 512 calls the character recognition engine part 52 via the API (step S13). The character recognition engine part 52 performs the character recognition process. The character candidate list 33 of the handwritten characters and information indicating presence or absence of the emoticon 9 in the character candidate list 33 are acquired.

The emoticon candidate ranking part 523-2 determines by referring to the information indicating the presence or absence of the emoticon 9 whether the character candidate list 33 includes the emoticons 9 (step S13-2). When the character candidate list 33 does not include the emoticons 9, the order of the emoticons 9 is not changed in the recognition result 38. Hence, the recognition result 38, in which the candidates are listed in the order of the recognition scores in the character candidate list 33, is output (step S13-4).

Next, the candidate selection part 513 displays the recognition result 38 in the candidate display area 2d-2 based on the recognition score (step S14). The candidate selection part 513 displays the character, which the user selects from the candidate display area 2d-2, in the edit area 2a, and also adds the selected character to the fixed character string 39 (step S15).

On the other hand, when the character candidate list 33 includes the emoticons 9, the order of the emoticons 9 is changed. The emoticon candidate ranking part 523-2 performs the emoticon candidate ranking process. The emoticon candidate ranking process corresponds to step S51 through S55 in the same manner as the first functional configuration example, and the explanations thereof will be omitted.

After the emoticon candidate ranking part 523-2 performs the emoticon candidate ranking process, the candidate selection part 513 displays the recognition result 38 in the candidate display area 2d-2 based on the changed recognition scores (step S14). After that the candidate selection part 513 displays the character, which is selected by the user from the candidate display area 2d-2, in the edit area 2a, and adds the selected character to the fixed character string 39 (step S15).

Figure 16:
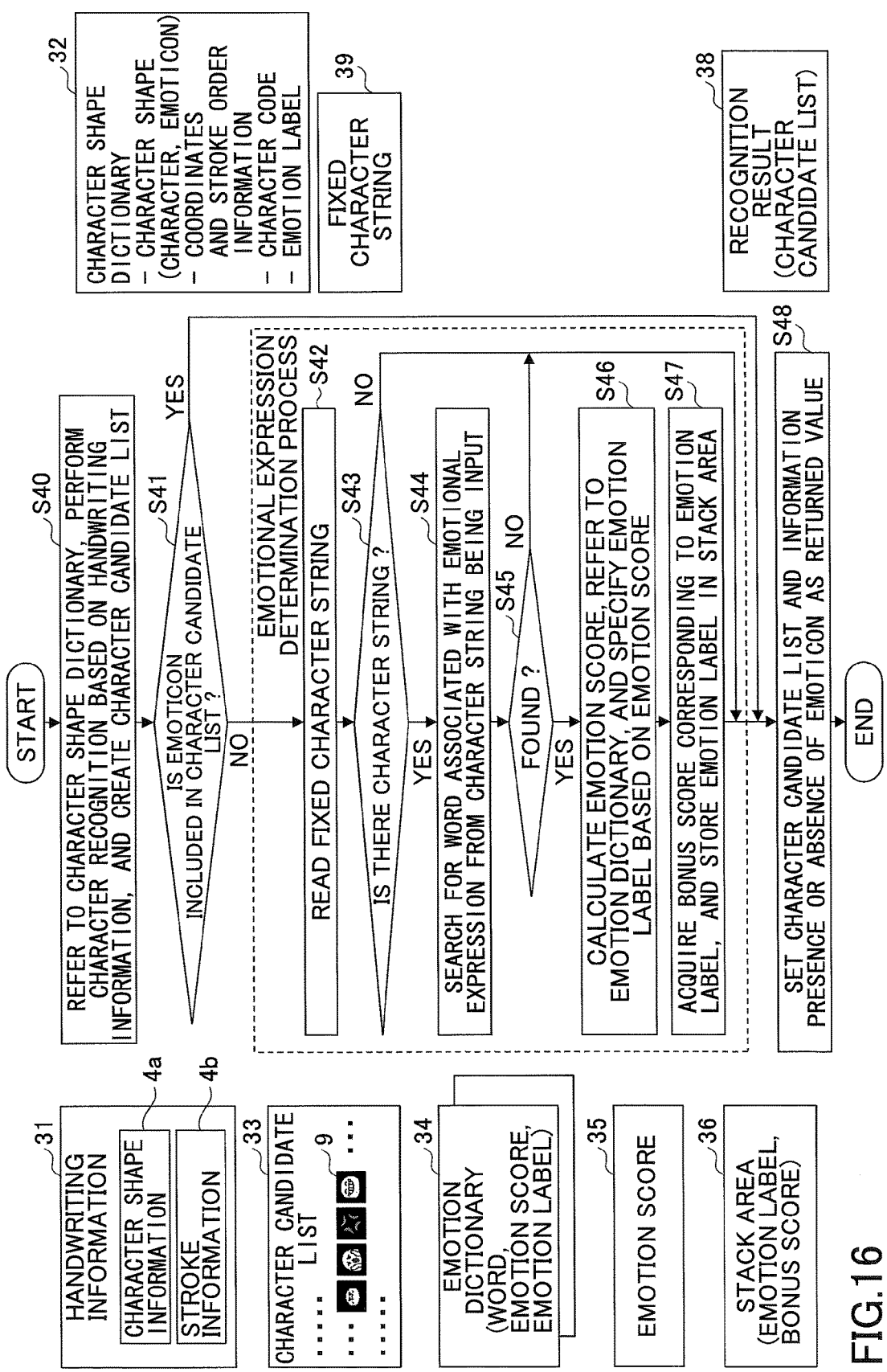
FIG. 16 is a flowchart for explaining the handwriting recognition process in the second functional configuration example in FIG. 14

A handwriting recognition process performed by the character recognition engine part 52 will be described. FIG. 16 is a flowchart for explaining the handwriting recognition process in the second functional configuration example in FIG. 14. In FIG. 16, steps are the same as those in the first functional configuration example in FIG. 11, and the explanations thereof will be omitted.

In FIG. 16, when the emoticon 9 is not included in the character candidate list 33 acquired by the character recognition (NO of step S41), the character recognition engine part 52 returns the returned value including the character candidate list 33, and information indicating that the character candidate list 33 does not include the emoticon 9, to the handwriting input part 51 (step S48), and terminates the handwriting recognition process.

Also, when the character candidate list 33 acquired by the character recognition includes the emoticon 9 (Yes of step S41), in response to an end of the emotional expression determination process performed by the emotional expression determination part 522, the character recognition engine part 52 returns the returned value including the character candidate list 33, and information indicating that the character candidate list 33 includes the emoticon 9, to the handwriting input part 51 (step S48), and terminates the handwriting recognition process.

Figure 17:
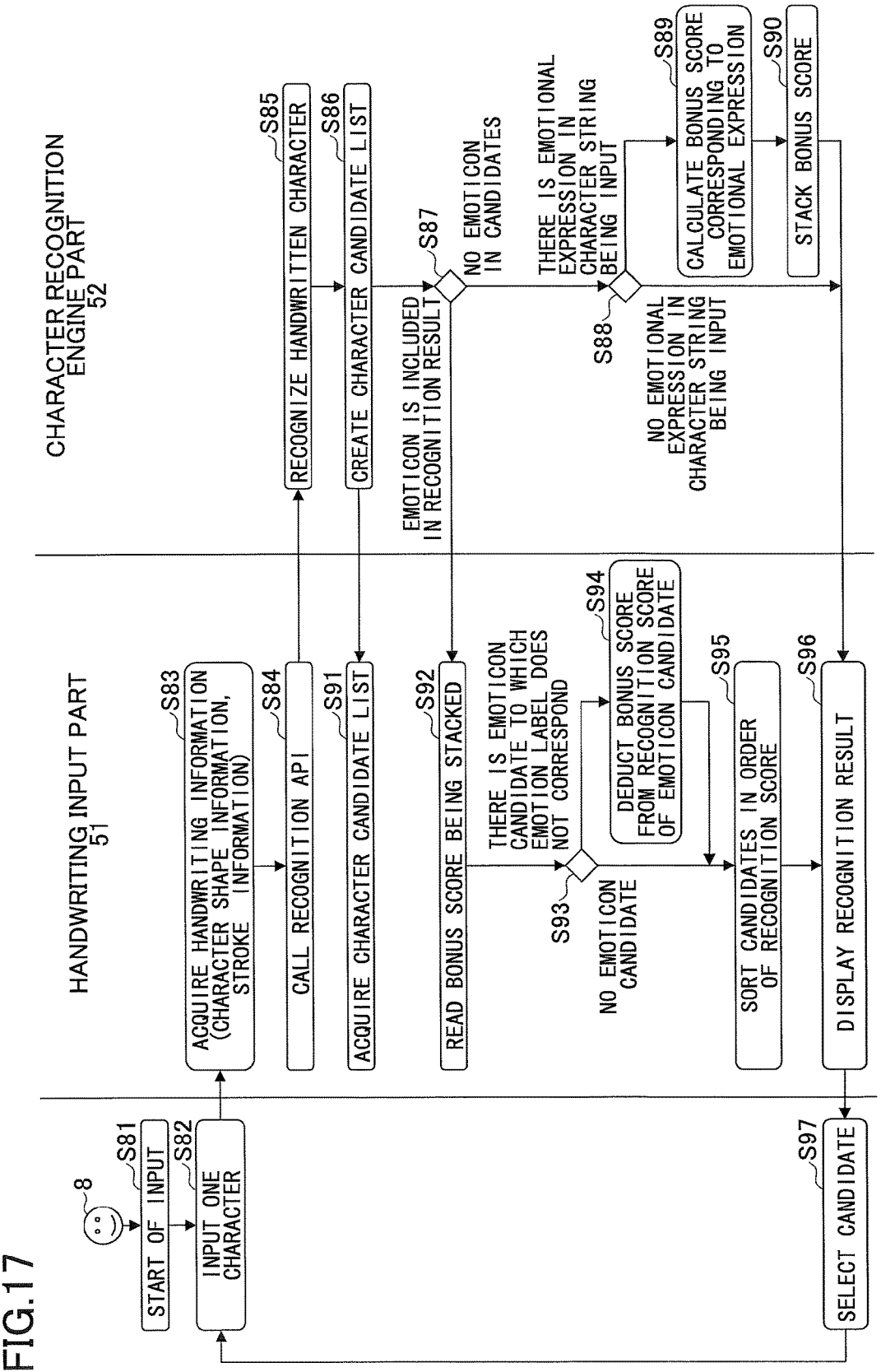
FIG. 17 is a diagram illustrating a process sequence in the second functional configuration example in FIG. 14.

FIG. 17 is a diagram illustrating a process sequence in the second functional configuration example in FIG. 14. In FIG. 17, the user 8 starts input to the character input screen 1 (step S81), and inputs one character (step S82).

The handwriting information acquisition part 511 of the handwriting input part 51 acquires the handwriting information 31 (the character shape information 4a and stroke information 4b) (step S83), and the recognition API calling part 512 calls the character recognition engine part 52 via the API (step S84).

In the character recognition engine part 52, the character recognition part 521 recognizes the handwritten character by using the handwriting information 31 (step S85), and creates the character candidate list 33 (step S86). The character recognition part 521 refers to the character shape dictionary 32 by using the character code of the character candidate list 33, and determines whether the character candidate list 33 includes the emoticon 9 as the candidate (step S87).

When the character candidate list 33 does not include the emoticon 9, the emotional expression determination part 522 starts the emotional expression determination process. The emotional expression determination part 522 determines whether there is the word associated with the emotional expression in an input character string (step S88). When there is the word associated with the emotional expression, the emotional expression determination part 522 calculates the bonus score corresponding to the emotional expression related to the word (step S89), and stacks the bonus score (step S90). The character candidate list 33 and the information indicating that the character candidate list 33 does not include the emoticon 9 are provided to the handwriting input part 51, and the character recognition engine part 52 terminates its process.

On the other hand, when the emoticon 9 exists as the candidate, the character candidate list 33 and the information indicating that the character candidate list 33 includes the emoticon 9 are provided to the handwriting input part 51. In the character recognition engine part 52, the emoticon candidate ranking process is performed by the emoticon candidate ranking part 523-2. The emoticon candidate ranking part 523-2 acquires the character candidate list 33 (step S91), reads the bonus score stacked in the stack area 36 (step S92), and determines whether there is the emoticon candidate which does not correspond to the emotion label stacked in the stack area 36 in the emoticon candidates (step S93).

When there is no emoticon candidate which does not correspond to the emotion label, the emoticon candidate ranking part 523-2 advances to step S95. When there is the emoticon candidate which does not correspond to the emotion label, the emoticon candidate ranking part 523-2 deducts the bonus score from the recognition score of the emoticon candidate (step S94).

The emoticon candidate ranking part 523-2 sorts the emoticon candidates in accordance with their recognition scores (step S95). The candidate selection part 513 displays as the candidate display the character candidates and/or the emoticon candidates at area 2*d*-2 based on the recognition result 38 in which the emoticon candidates are sorted by the recognition score (step S96). The user 8 selects one of the candidates from the candidate display area 2*d*-2 (step S97). Then, the process sequence goes back to step S82, and when the user 8 inputs a next character (step S82), the above described process is repeated in the same manner.

FIG. 18 is a diagram illustrating a data example of the emotion dictionary 34. In FIG. 18, the emotion dictionary 34 includes a data structure based on the "Emotion Dictionary" of Tadahiko Kumamoto et al. In the emotion dictionary 34, a value in an emotion axis is associated to each of words. The emotion dictionary 34 may include items of a word, an emotion axis 1, an emotion axis 2, an emotion axis 3, and the like. In the embodiment, three typical emotion axes are applied.

The emotion axis 1 indicates that a subject word is likely to co-occur with either a word "sad" or an opposite expressional word "joyful". The emotion axis 2 indicates that the subject word is likely to co-occur with either a word "anger" or an opposite expressional word "happy". The emotion axis 3 indicates that the subject word is likely to co-occur with either a word "frightened" or an opposite expressional word "peaceful".

The closest to "1" the value of the emotion axis is, an emotion represented by the word expresses "joyful", "happy", or "peaceful". The closest to "0" the value of the emotion axis is, the emotion represented by the word expresses "sad", "anger", or "frightened".

Figure 19:
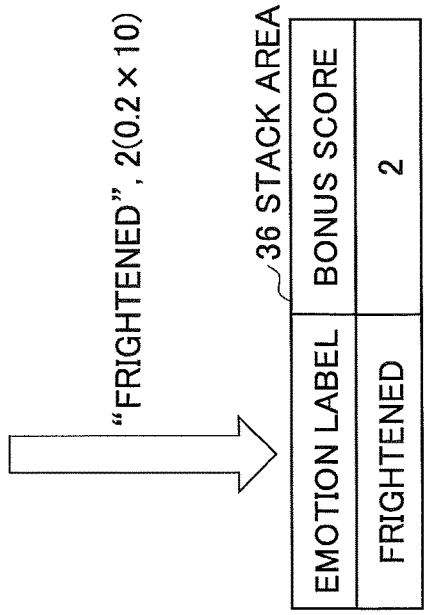
FIG. 19 is a diagram for explaining an acquisition example of a bonus score.

Next, an acquisition example of the bonus score will be described in a case in which a word "台風" (typhoon) is in the character string input by the user 8. FIG. 19 is a diagram for explaining the acquisition example of the bonus score. In FIG. 19, referring to the emotion dictionary 34 in FIG. 18, it is determined that the word "台風" (typhoon) indicates a "sad" emotion based on a value "0.351" of the emotion axis 1, indicates an "anger" emotion much more than a "joyful" emotion based on a value "0.459" of the emotion axis 2, and indicates a "frightened" emotion based on a value "0.203" of the emotion axis 3.

By referring to the values of the emotion axes 1 through 3, the emotion is specified based on the values being the closest to "0" or the closest to "1". A second decimal place of the value "0.203" of the emotion axis is rounded, and a value "0.2" is acquired. In addition, the value "0.2" is multiplied with "10", and an inter "2" is acquired. The value "2" is determined as the bonus score, and stored in the stack area 26 by associating with the emotion label "frightened".

The acquisition method of the bonus score is not limited to the above described calculation method. Alternatively, a table including the bonus score may be prepared beforehand for each of the words "sad", "joyful", "anger", "happy", "frightened", and "peaceful". This table may be referred to in order to acquire the bonus score.

Next, a process example in the embodiment will be described in a case of a first character string which includes one word associated to the emotional expression. It is assumed that the user 8 inputs the first character string "台風が来る?⬚" ("typhoon is coming?⬚" in English) by handwriting. The emoticon 9 in the first character string is regarded as a "frightened" face icon depicting the frightened emotion. In the first character string, the word "台風" (typhoon) is associated with the emotional expression.

Figure 20:
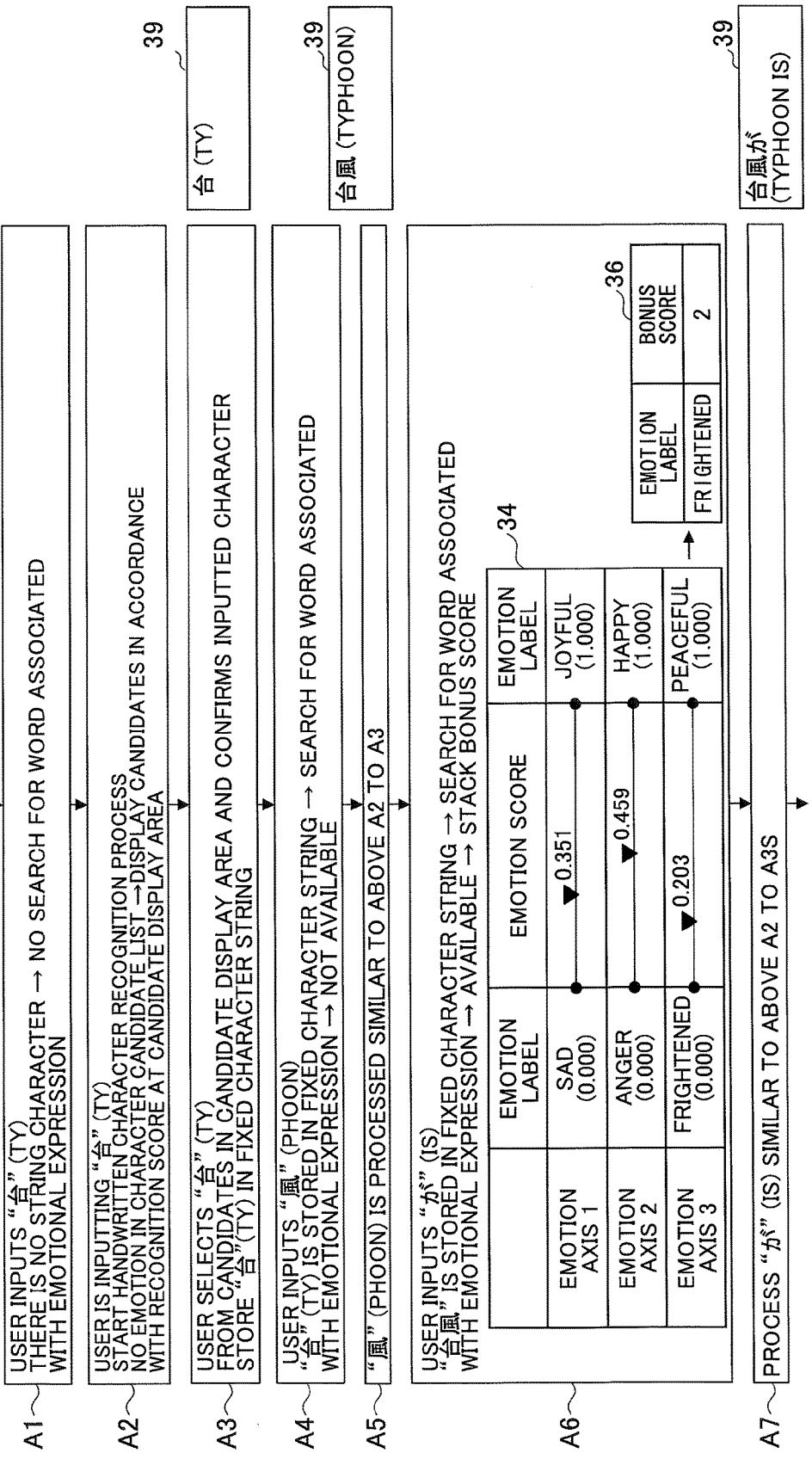
FIG. 20 is a diagram for explaining a process example in a case in which a user inputs a first character string by handwriting.
Figure 21:
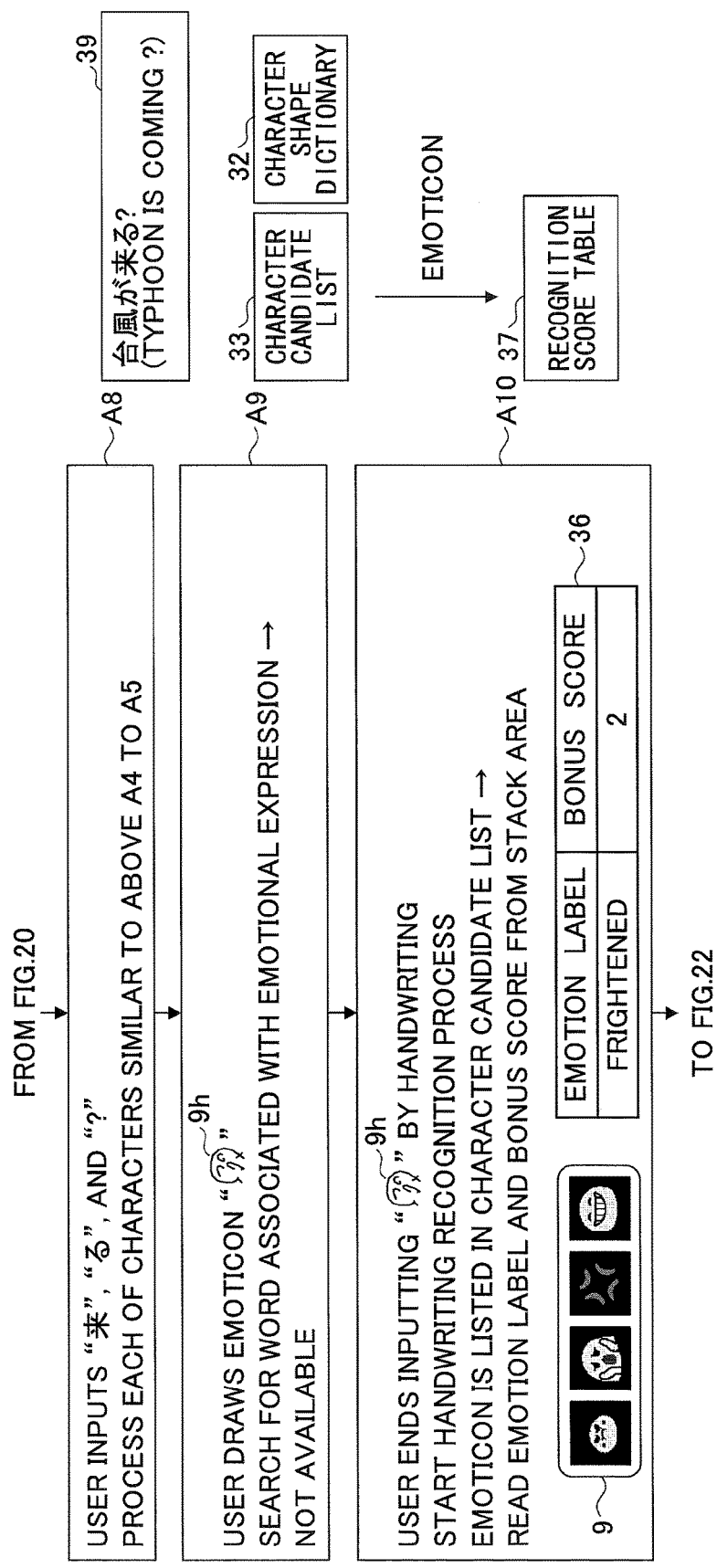
FIG. 21 is a diagram for explaining the process example in the case in which the user inputs the first character string by handwriting.
Figure 26:
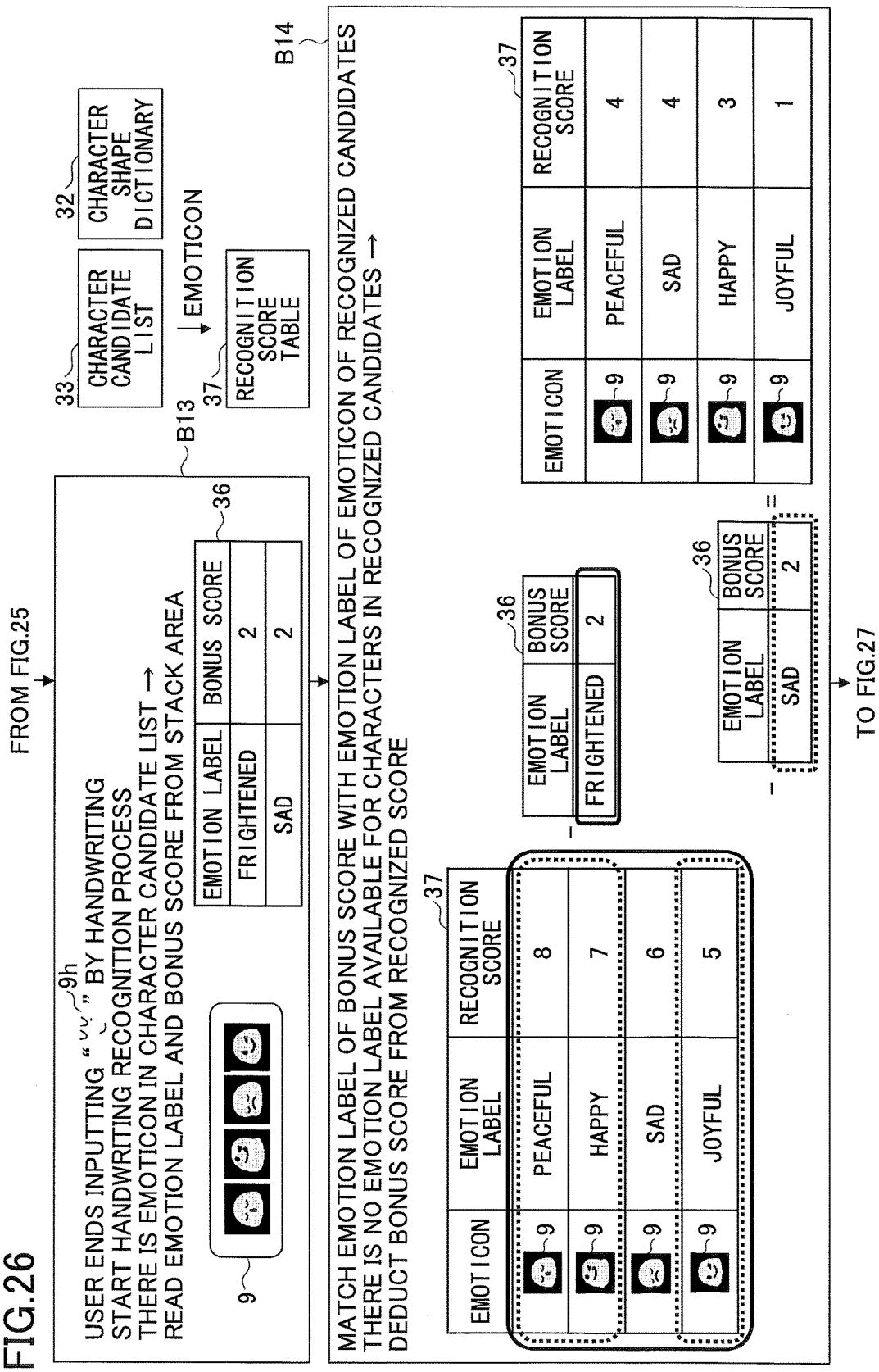
FIG. 26 is a diagram for explaining another process example in the case in which the user inputs the second character string by handwriting.

FIG. 20, FIG. 21, and FIG. 22 are diagrams for explaining the process example in a case in which the user 8 inputs the first character string by handwriting. In FIG. 20, in step A1, when the user 8 inputs a first character "台" (ty of "typhoon") by using the finger 3 of the user 8 in the handwriting input area 2*d*-3 of the character input screen 1, since there is no entered character in the fixed character string 39, a search for the word associated with the emotional expression is not performed.

In step A2, when the user ends inputting the first character "台" (ty), the handwriting recognition process starts. Since there is no emoticon 9 in the character candidate list 33, the candidates are displayed in the candidate display area 2*d*-2 in accordance with the recognition scores of the character candidate list 33.

In step A3, the user 8 selects a character "台" (ty) from the candidates in the candidate display area 2*d*-2, and the character "台" (ty) is fixed as the user's input. The character "台" (ty) is added to the fixed character string 39.

In step A4, the user 8 inputs a second character "風" (phoon of "typhoon"). Since the character "台" (ty) is stored in the fixed in the fixed character string 39, the word associated with the emotional expression is searched for by referring to the emotion dictionary 34. However, the emotional expression corresponding to the character "台" (ty) is not found. Hence, it is determined that there is no word associated in the emotional expression in the fixed character string 39.

In step A5, the above steps A2 to A4 are performed for the second character "風" (phoon), and the second character "風" (phoon) is stored by following to the first character "台" (ty) in the fixed character string 39. Accordingly, the fixed character string 39 indicates a character string "台風" (typhoon).

In step A6, the user 8 inputs a third character "が" (is). Since the characters "台風" (typhoon) have already been stored in the fixed character string 39, the word associated with the emotional expression is searched for in the fixed character string 39 by referring to the emotion dictionary 34. In this case, a word "台風" is retrieved as the word associated with the emotional expression.

In the emotion dictionary 34, a value closest "0" or "1" is acquired from the emotion scores of the emotion axes 1 to 3 corresponding to the word "台風" (typhoon). Also, an emotion label directed by the acquired value is obtained. In this case of the word "台風" (typhoon), it is determined that the emotion label "frightened" expresses the emotion the most, and the emotion score "0.203" is acquired. Alternatively, the bonus score is acquired by referring to a correspondence table for the emotion label and the bonus score which is prepared beforehand. The emotion label "frightened" and the bonus score "2" are stored in the stack area 36.

In step A7, the above described steps A2 to A3 are conducted in the same manner for the third character "が" (is). The third character "が" (is) is stored in the fixed character string 39. The fixed character string 39 currently stores a character string "台風が" (typhoon is). This process advances to step A8 in FIG. 21.

In step A8, the user 8 inputs fourth and fifth characters "来る" (coming), and a sixth character "?". The above described steps A4 to A5 are conducted in the same manner for each of the fourth, fifth, and sixth characters. The fourth character "来", the fifth character "る", and the sixth character "?" are stored in the fixed character string 39. Hence, the fixed character string 39 currently stores a character string "台風が来る"? (typhoon is coming ?).

In step A9, the user 8 draws an emoticon 9h in the handwriting input area 2d-3 to express the "frightened" emotion. After the character string "台風" (typhoon), the word associated with the emotion expression is searched for by referring to the emotion dictionary 34. It is determined that no word exists for the handwritten emoticon 9h.

In step A10, the user 8 ends inputting the emoticon 9h being handwritten. The handwriting character recognition process starts. Since the character candidate list 33 includes the emoticon 9, the emotion label "frightened" and the bonus score "2" are read out from the stack area 36.

The emoticon 9 is retrieved from the character candidate list 33 and the recognition score is obtained for the retrieved emoticon 9. The recognition score table 37 is created. In this example, four emoticons 9 are listed in the recognition score table 37. Also, the emoticon label of the emoticon 9 is acquired by referring to the character shape dictionary 32 according to the embodiment, and is stored in the recognition score table 37 by associating with the emoticon 9.

In step A11 in FIG. 22, the emotion label "frightened" which is acquired from the stack area 36 is matched with the emotion label which is possessed by each of the emoticons 9 listed in the recognition score table 37. The emoticon 9 which does not have the emotion label "frightened" is specified from the recognition score table 37. The bonus score is deducted from the recognition score of the specified emoticon 9. In this example, there are three emoticons 9 other than the emoticon 9 having the emotion label "frightened".

The bonus score "2" is deducted from each of the recognition scores "8", "6", and "5" which correspond to the emotion labels of these three emoticons 9. In the recognition score table 37 after the recognition scores are changed, the emoticons 9 are sorted in a descending order of the recognition score. As a result, the emoticon 9 of the emotion label "frightened" is listed as a first candidate. The changed recognition scores are applied to the character candidate list 33, and the recognition result 38 is obtained.

In step A12, the recognition result 38 is displayed in the handwriting input area 2d-3, and the user 8 selects the emoticon 9 having the emotion label "frightened" from the candidates, and the emoticon 9 is fixed as the user's input. The emoticon 9 having the emotion label "frightened" is stored in the fixed character string 39. That is, the first character string is entered and fixed.

Next, another process example in the embodiment will be described in a case of including two words associated with the emotional expression as a second character string. It is assumed that the user 8 inputs the second character string "台風が来て、被害が大きい ☹" ("typhoon has come and its damage is great ☹" in English) by handwriting. The emoticon 9 in the second character string is regarded as a "sad" face icon depicting the sad emotion. In the second character string, the words "台風" (typhoon) and "被害" (damage) are associated with the emotional expression.

FIG. 23 through FIG. 27 are diagrams for explaining another process example in a case in which the user 8 inputs the second character string by handwriting. In FIG. 23, in step B1, the user 8 inputs the first character "台" (ty) with the finger 3 in the handwriting input area 2d-3 of the character input screen 1. Since there are no characters entered by the user 8 in the fixed character string 39 before that, the word associated with the emotional expression is not searched for.

In step B2, when the user 8 inputs a first character "台" (ty of "typhoon"), the handwriting recognition process starts. Since there is no emoticon 9 in the character candidate list 33, the candidates are displayed in the candidate display area 2d-2 in accordance with the recognition score of the character candidate list 33.

In step B3, the user 8 selects the character "台" (ty) from the candidates in the candidate display area 2d-2, and the character "台" (ty) is fixed as the user's input. The character "台" (ty) is added to the fixed character string 39.

In step B4, the user 8 inputs a second character "風" (phoon of "typhoon"). Since the character "台" (ty) is stored in the fixed in the fixed character string 39, the word associated with the emotional expression is searched for by referring to the emotion dictionary 34. However, the emotional expression corresponding to the character "台" (ty) is not found. Hence, it is determined that there is no word associated in the emotional expression in the fixed character string 39.

In step B5, the above described steps B2 to B3 are conducted in the same manner for the second character "風" (phoon). As a result, the second character "風" (phoon) is stored in the fixed character string 39. The fixed character string 39 currently stores a character string "台風" (typhoon).

In step B6 in FIG. 24, the user 8 inputs a third character "が" (has). Since the characters "台風" (typhoon) have already been stored in the fixed character string 39, the word associated with the emotional expression is searched for from the fixed character string 39 by referring to the emotion dictionary 34. In this case, a word "台風" is retrieved as the word associated with the emotional expression.

In the emotion dictionary 34, a value closest "0" or "1" is acquired from the emotion scores of the emotion axes 1 to 3 corresponding to the word "台風" (typhoon). Also, an emotion label directed by the acquired value is obtained. In this case of the word "台風" (typhoon), it is determined that the emotion label "frightened" expresses the emotion the most, and the emotion score "0.203" is acquired. Alternatively, the bonus score is acquired by referring to the correspondence table for the emotion label and the bonus score which is prepared beforehand. The emotion label "frightened" and the bonus sore "2" are stored in the stack area 36.

In step B7, the above described steps B2 to B3 are conducted in the same manner for the third character "が" (has). The third character "が" (has) is stored in the fixed character string 39. The fixed character string 39 currently stores a character string "台風が" (typhoon has). This process advances to step B8 in FIG. 25.

In step B8, the user 8 inputs fourth, fifth, and sixth characters "来て" (come, and), and a seventh character "被" (da of damage). The above described steps B4 to B5 are conducted in the same manner for each of the fourth, fifth, sixth, and seventh characters. The fourth character "来", the fifth character "て", the sixth character "", and the seventh character "被" are stored in the fixed character string 39. Hence, the fixed character string 39 currently stores a character string "台風が来て、被" (typhoon has come, and its da).

In step B9, the user 8 inputs an eighth character "害" (image of damage). Since the seventh character "被" (da) is stored in the fixed character string 39, the word associated with the emotion expression is searched for by referring to the emotion dictionary 34. The emotional expression corresponding to one character "被" (da) is not found. Hence, it is determined that there is no word associated with the emotional expression in the fixed character string 39.

In step B10, the above described steps B2 to B3 are conducted in the same manner for the eighth character "害" (mage). Then, the eighth character "害" (mage) is stored in the fixed character string 39. The fixed character string 39 currently stores "台風が来て、被害" (typhoon has come, and its damage).

In step B11, the user 8 inputs a ninth character "が" (is). Since two characters "被害" (damage in English) are stored in the fixed character string 39, the word associated with the emotional expression is retrieved from the fixed character string 39 by referring to the emotion dictionary 34. In this case, a word "被害" (damage) is retrieved as the word associated with the emotional expression.

In the emotion dictionary 34, a value closest "0" or "1" is acquired from the emotion scores of the emotion axes 1 to 3 corresponding to the word "被害" (damage). Also, an emotion label directed by the acquired value is obtained. In this case of the word "被害" (damage), it is determined that the emotion label "sad" expresses the emotion the most. The bonus score "2" is acquired by referring to the correspondence table for the emotion label and the bonus score which is prepared beforehand. The emotion label "sad" and the bonus sore "2" are stored in the stack area 36.

In step B12, the above described steps B2 to B3 are conducted in the same manner for the ninth character "が" (is). The ninth character "が" (is) is stored in the fixed character string 39. The fixed character string 39 currently stores "台風が来て、被害が、" (typhoon has come, and its damage is). This process advances to step B13 in FIG. 26.

In step B13, the user 8 inputs an emoticon 9h in the handwriting input area 2d-3 to express the "sad" emotion. After the character string "台風" (typhoon), the word associated with the emotion expression is searched for by referring to the emotion dictionary 34. It is determined that no word exists for the handwritten emoticon 9h.

In step B14, the user 8 ends inputting the handwritten emoticon 9h. The handwriting character recognition process starts. Since the character candidate list 33 includes the emoticon 9, in addition to the emotion label "frightened" and the bonus score "2", the emotion label "sad" and the bonus score "2" are read out from the stack area 36.

The emoticons 9 in the character candidate list 33 and the recognition score are retrieved and the recognition score table 37 is created. In the second character string, four emoticons 9 are listed in the recognition table 37. Also, the emotion labels of the emoticons 9 are acquired by referring to the character shape dictionary 32 according to the embodiment, and are stored in the recognition table 37 by associating with the emoticons 9.

Figure 27:
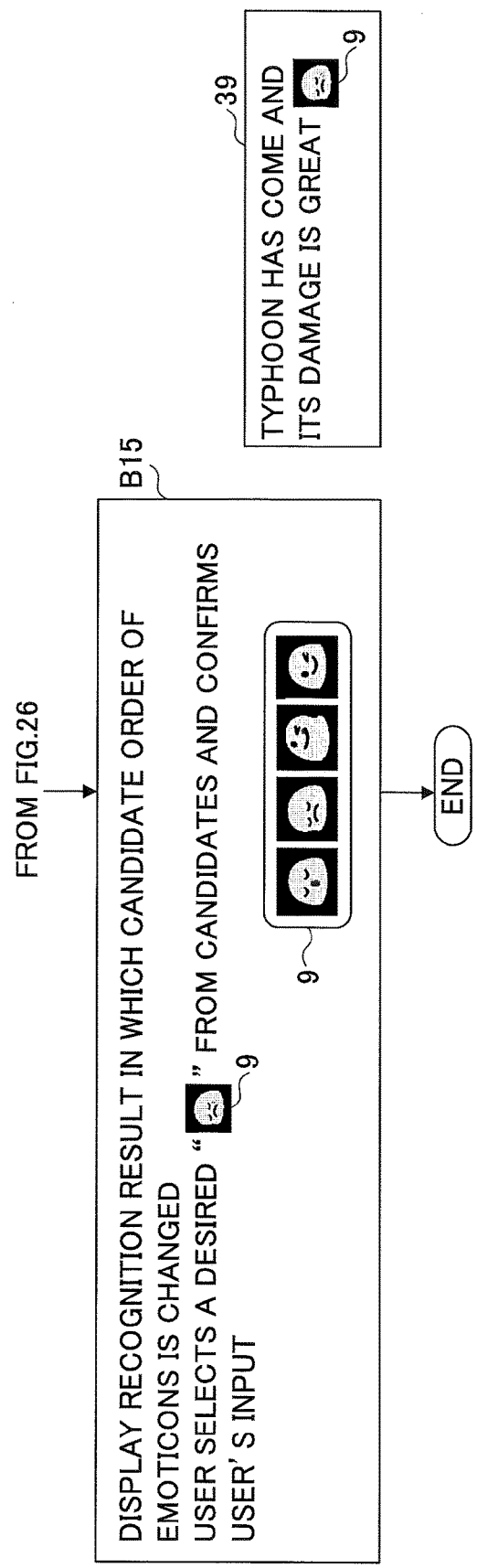
FIG. 27 is a diagram for explaining another process example in the case in which the user inputs the second character string by handwriting.

In step B15 in FIG. 27, the emotion label "frightened" acquired from the stack area 36 is matched with the emotion label possessed by each of the emoticons 9 listed in the recognition table 37. The emoticons 9, which do not have the emotion label "frightened", are specified from the recognition score table 37, and the bonus score is deducted from the recognition score for each of the specified emoticons 9. In this case, since all four emoticons 9 do not have the emotion label "frightened", each of recognition scores of the four emoticons 9 is reduced by the bonus score "2".

Moreover, the emotion label "sad" acquired from the stack area 36 is matched with the emotion label possessed by each of the emoticons 9. The emoticon 9, which does not have the emotion label "sad", is specified from the recognition score table 37, and the bonus score is deducted from the recognition score for each of the specified emoticons 9. In this case, since three emoticons 9 do not have the emotion label "sad", each of recognition scores of the three emoticons 9 is further reduced by the bonus score "2".

As a result, for the emoticon 9 of the emotion label "peaceful", the recognition score "8" is reduced by a total bonus score "4" and a changed recognition score indicates "4". For the emoticon 9 of the emotion label "sad", the recognition score "7" is reduced by the total bonus score "4" and the changed recognition score indicates "3". Also, for the emoticon 9 of the emotion label "joyful", the recognition score "5" is reduced by the total bonus score "4" and the changed recognition score indicates "1".

On the other hand, for the emoticon 9 of the emotion label "sad", the recognition score "6" is reduced by the bonus score "2" alone and the changed recognition score indicates "4".

In the recognition score table 37 before the recognition score is changed and after a first change of the recognition score, the emotion labels are listed in an order of "peaceful",
"happy",
"sad", and
"joyful".

However, in the recognition score table 37 after a second change, in a descending order of the recognition score, the emotion labels are listed in an order of "peaceful",
"sad",
"happy", and
"joyful". The emotion label "sad" is previously listed at a third rank in the emoticons 9. On the contrary, the emotion label "sad" is listed at a second rank after the second change. The recognition scores after the second change are applied to the character candidate list 33, and the recognition result 38 is obtained.

In step B15, the recognition result 38, in which a candidate rank of the emoticons 9 is changed, is displayed in the handwriting input area 2d-3, and the user 8 selects the emoticon 9 having the emotion label "sad" from the candidates, and the user's input is fixed. The emoticon 9 having the emotion label "sad" is stored in the fixed character string 39. The input of the second character storing is fixed.

Also, in a case of inserting the emoticon 9 by handwriting, based on the fixed character string 39, the emotion label may be specified from the word before, after, or around an inserted position. As described above, it is possible to present the candidates of the emoticons 9 in a precise recognition order.

By adjusting the recognition score based on the emotion label, which is related to the word associated with the emotional expression in the fixed character string 39, it is possible to improve the candidate order of the emoticons 9.

In the above described embodiment, even for the emoticons 9 in which the character shape information 4a and the stroke information 4b are not always useful and the stroke order and a standard character shape do not exist, that is, a writing rule depends on individuals and is not defined, it is possible to precisely present the emoticon candidates.

By analyzing a context before, after, or around a specific position in a text where a handwriting input is received, it is possible to generate conversion candidates of the handwriting input.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A handwriting input conversion apparatus, comprising:
a memory; and
a processor configured to the memory and the processor configured to
receive handwriting input for a position in a text;
conduct a character recognition with respect to the handwriting input;
determine, by searching for a word associated with an emotional expression in an entered character string, whether the emotional expression is included in the entered character string, and store an emotion information pertinent to a determination result in the memory, when an emoticon does not exist in conversion candidates as a result of the character recognition; and
read the emotion information from the memory, and change a candidate order of one or more emoticons indicated by the result of the character recognition based on the emotion information, when the one or more emoticons exist in the conversion candidates as the result of the character recognition.

2. A handwriting input conversion apparatus, comprising: the
a memory; and
a processor configured to the memory and the processor configured to receive a handwriting input for a position in a text;
conduct a character recognition with respect to the handwriting input;
determine by searching for a word associated with an emotional expression in an entered character string, whether the emotional expression is included in the entered character string; and
store an emotion information pertinent to a determination result in the memory, when an emoticon does not exist in conversion candidates as a result of the character recognition,
wherein when receiving the handwriting input the processor reads the emotion information from the memory, and changes a candidate order of one or more emoticons indicated by the result of the character recognition based on the emotion information, when the one or more emoticons exist in the conversion candidates as the result of the character recognition.

3. The conversion apparatus as claimed in claim 2, wherein
the memory stores an emotion dictionary, in which multiple emotion labels expressing emotions are indicated with emotion scores each indicating an emotion degree for each of words, and when determining whether the emotional expression is included in the entered character string, the processor acquires the emotion label and the emotion score for the word searched in the entered character string from the emotion dictionary, and stores a table indicating the emotion label and the emotion score in the memory.

4. The conversion apparatus as claimed in claim 3, wherein
the memory stores character shape dictionary data, in which an emotion label using a word expressing the emotion corresponds to each of character shapes;
when conducting the character recognition, the processor refers to the character shape dictionary data, and includes the emotion label in the result of the character recognition; and
when reading the emotion information, the processor reduces a recognition score indicating a consistency degree between the handwriting input and the emoticon which is included in the one or more emoticons indicated by the result of the character recognition and has an emotion label other than the emotion label listed in the table.

5. A non-transitory computer-readable recording medium storing a handwriting input conversion program that causes a computer to perform a process comprising:
receiving a handwriting input for a position in a text;
conducting a character recognition with respect to the handwriting input;
determining, by searching for a word associated with an emotional expression in an entered character string, whether the emotional expression is included in the entered character string, and storing an emotion information pertinent to a determination result in the memory, when an emoticon does not exist in conversion candidates as a result of the character recognition; and
reading the emotion information from the memory, and changing a candidate order of one or more emoticons indicated by the result of the character recognition based on the emotion information, when the one or more emoticons exist in the conversion candidates as the result of the character recognition.

6. A conversion method performed by a computer, the conversion method comprising:
receiving a handwriting input for a position in a text;
conducting a character recognition with respect to the handwriting input;
determining, by searching for a word associated with an emotional expression in an entered character string, whether the emotional expression is included in the entered character string, and storing an emotion information pertinent to a determination result in the memory, when an emoticon does not exist in conversion candidates as a result of the character recognition; and
reading the emotion information from the memory, and changing a candidate order of one or more emoticons indicated by the result of the character recognition based on the emotion information, when the one or more emoticons exist in the conversion candidates as the result of the character recognition.

7. A non-transitory computer-readable recording medium storing a handwriting input conversion program that causes a computer to perform a process comprising:
receiving a handwriting input for a position in a text;
conducting a character recognition with respect to the handwriting input;

determining, by searching for a word associated with an emotional expression in an entered character string, whether the emotional expression is included in the entered character string; and storing an emotion information pertinent to a determination result in a memory, when an emoticon does not exist in conversion candidates as a result of the character recognition, wherein the receiving of the handwriting input includes reading the emotion information from the memory, and changing a candidate order of one or more emoticons indicated by the result of the character recognition based on the emotion information, when the one or more emoticons exist in the conversion candidates as the result of the character recognition.

8. The non-transitory computer-readable recording medium as claimed in claim 7, wherein the determining acquires an emotion label and an emotion score for the word searched in the entered character string from an emotion dictionary stored in the memory, in which multiple emotion labels expressing emotions are indicated with emotion scores each indicating an emotion degree for each of words, and stores a table indicating the emotion label and the emotion score in the memory.

9. The non-transitory computer-readable recording medium as claimed in claim 8, wherein the conducting of the character recognition refers to character shape dictionary data, and includes the emotion label in the result of the character recognition; and the reading of the emotion information reduces a recognition score indicating a consistency degree between the handwriting input and the emoticon which is included in the one or more emoticons indicated by the result of the character recognition and has an emotion label other than the emotion label listed in the table, wherein the character shape dictionary data are stored in the memory, in which the emotion label using the word expressing the emotion corresponds to each of character shapes.

* * * * *